(12) United States Patent
Rehrig et al.

(10) Patent No.: US 12,064,919 B2
(45) Date of Patent: Aug. 20, 2024

(54) METHOD FOR FORMING A THREE DIMENSIONAL BODY FROM A MIXTURE WITH A HIGH CONTENT OF SOLID PARTICLES

(71) Applicant: SAINT-GOBAIN CERAMICS & PLASTICS, INC., Worcester, MA (US)

(72) Inventors: Paul W. Rehrig, Sterling, MA (US); Matthew Gacek, Rutland, MA (US); Bojana Lante, Northborough, MA (US); Michael Sender, Cambridge, MA (US); Jean-Marie Lebrun, Marlborough, MA (US)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 0 days.

(21) Appl. No.: 15/767,506

(22) PCT Filed: Oct. 14, 2016

(86) PCT No.: PCT/US2016/057061
§ 371 (c)(1),
(2) Date: Apr. 11, 2018

(87) PCT Pub. No.: WO2017/066584
PCT Pub. Date: Apr. 20, 2017

(65) Prior Publication Data
US 2018/0290380 A1    Oct. 11, 2018

Related U.S. Application Data

(60) Provisional application No. 62/242,150, filed on Oct. 15, 2015.

(51) Int. Cl.
*B29C 64/165*    (2017.01)
*B28B 1/00*    (2006.01)
(Continued)

(52) U.S. Cl.
CPC ............ *B29C 64/165* (2017.08); *B28B 1/001* (2013.01); *B29C 35/0805* (2013.01);
(Continued)

(58) Field of Classification Search
CPC .................. B29C 64/165; B29C 70/58; B29C 2035/0827; B29C 64/264; B33Y 70/00; B33Y 10/00
See application file for complete search history.

(56) References Cited

U.S. PATENT DOCUMENTS 4,233,421 A    11/1980    Worm
4,912,171 A    3/1990    Grootaert et al.
(Continued)

FOREIGN PATENT DOCUMENTS

CN    101213070 B    6/2012
CN    103302860 A    9/2013
(Continued)

OTHER PUBLICATIONS

Alec last name unknown, "3M makes non-stick PTFR polymers 3D printable through new patent-pending tech," 3ders.org, 2016, 3 pages.
(Continued)

*Primary Examiner* — Nahida Sultana
*Assistant Examiner* — Virak Nguon
(74) *Attorney, Agent, or Firm* — Abel Schillinger, LLP; Adrian Lawrence

(57) ABSTRACT

A method for continuously forming a three-dimensional body from a mixture, the mixture comprising at least 15 vol % solid particles and a radiation curable material. The method allows the continuous production of three-dimensional bodies comprising to a high content ceramic particles at a forming speed of at least 25 mm/hour.

28 Claims, 18 Drawing Sheets

(51) Int. Cl.
| | |
|---|---|
| *B29C 35/08* | (2006.01) |
| *B29C 64/129* | (2017.01) |
| *B29C 64/135* | (2017.01) |
| *B29C 64/264* | (2017.01) |
| *B29C 70/58* | (2006.01) |
| *B33Y 10/00* | (2015.01) |
| *B33Y 70/10* | (2020.01) |
| *C04B 35/111* | (2006.01) |
| *C04B 35/14* | (2006.01) |
| *C04B 35/443* | (2006.01) |
| *C04B 35/486* | (2006.01) |
| *C04B 35/565* | (2006.01) |
| *C04B 35/584* | (2006.01) |
| *C04B 35/626* | (2006.01) |
| *C04B 35/632* | (2006.01) |
| *C04B 35/64* | (2006.01) |

(52) U.S. Cl.
CPC .......... *B29C 64/129* (2017.08); *B29C 64/135* (2017.08); *B33Y 70/10* (2020.01); *C04B 35/111* (2013.01); *C04B 35/14* (2013.01); *C04B 35/443* (2013.01); *C04B 35/486* (2013.01); *C04B 35/565* (2013.01); *C04B 35/584* (2013.01); *C04B 35/6263* (2013.01); *C04B 35/6264* (2013.01); *C04B 35/6269* (2013.01); *C04B 35/632* (2013.01); *C04B 35/64* (2013.01); *B29C 2035/0827* (2013.01); *B29C 64/264* (2017.08); *B29C 70/58* (2013.01); *B33Y 10/00* (2014.12); *C04B 2235/5409* (2013.01); *C04B 2235/5436* (2013.01); *C04B 2235/5445* (2013.01); *C04B 2235/6026* (2013.01); *C04B 2235/6562* (2013.01); *C04B 2235/6565* (2013.01); *C04B 2235/77* (2013.01); *C04B 2235/782* (2013.01); *C04B 2235/786* (2013.01); *C04B 2235/94* (2013.01); *C04B 2235/9615* (2013.01)

(56) References Cited

U.S. PATENT DOCUMENTS

| | | | |
|---|---|---|---|
| 5,247,180 A | 9/1993 | Mitcham et al. | |
| 5,391,072 A | 2/1995 | Lawton et al. | |
| 5,474,719 A * | 12/1995 | Fan | B29C 41/12 |
| | | | 264/401 |
| 5,545,367 A | 8/1996 | Bae et al. | |
| 5,980,813 A | 11/1999 | Narang et al. | |
| 6,027,326 A | 2/2000 | Cesarano, III et al. | |
| 6,117,612 A * | 9/2000 | Halloran | G03F 7/0037 |
| | | | 430/269 |
| 6,401,795 B1 | 5/2002 | Cesarano, III et al. | |
| 7,052,263 B2 | 5/2006 | John | |
| 7,158,849 B2 | 1/2007 | Huang et al. | |
| 7,438,846 B2 | 10/2008 | John | |
| 7,514,477 B2 | 4/2009 | Klare et al. | |
| 7,569,273 B2 | 8/2009 | Bredt | |
| 7,636,610 B2 | 12/2009 | Schillen et al. | |
| 7,815,835 B2 | 10/2010 | Stampfl et al. | |
| 7,892,474 B2 | 2/2011 | Shkolnik et al. | |
| 7,927,538 B2 | 4/2011 | Moszner et al. | |
| 8,022,155 B2 | 9/2011 | Liska et al. | |
| 8,057,731 B2 | 11/2011 | Abe | |
| 8,178,012 B1 | 5/2012 | Khan et al. | |
| 8,326,024 B2 | 12/2012 | Shkolnik et al. | |
| 8,666,142 B2 | 3/2014 | Shkolnik et al. | |
| 8,741,203 B2 | 6/2014 | Liska et al. | |
| 8,845,316 B2 | 9/2014 | Schillen et al. | |
| 8,974,717 B2 | 3/2015 | Maguire et al. | |
| 8,999,323 B2 | 4/2015 | Liska et al. | |
| 9,102,576 B1 | 8/2015 | Spowart | |
| 9,205,601 B2 | 12/2015 | DeSimone et al. | |
| 10,480,648 B2 | 11/2019 | Araki | |
| 2002/0149137 A1 | 10/2002 | Jang | |
| 2002/0161120 A1 | 10/2002 | Chapman | |
| 2003/0076041 A1 * | 4/2003 | Honda | H01J 61/30 |
| | | | 313/634 |
| 2005/0003189 A1 * | 1/2005 | Bredt | C08L 101/00 |
| | | | 428/402 |
| 2005/0248061 A1 | 11/2005 | Shkolnik et al. | |
| 2005/0259785 A1 | 11/2005 | Zhang | |
| 2007/0072762 A1 * | 3/2007 | Neil | B28B 1/00 |
| | | | 501/94 |
| 2008/0036117 A1 | 2/2008 | Hickerson et al. | |
| 2008/0113293 A1 | 5/2008 | Shkolnik | |
| 2009/0130449 A1 * | 5/2009 | El-Siblani | B29C 64/129 |
| | | | 264/401 |
| 2010/0003619 A1 | 1/2010 | Das et al. | |
| 2010/0283188 A1 * | 11/2010 | Rohner | A61C 13/0013 |
| | | | 264/401 |
| 2011/0291326 A1 | 12/2011 | Okamoto | |
| 2012/0010066 A1 | 1/2012 | Fischer et al. | |
| 2012/0245024 A1 | 9/2012 | Chaput et al. | |
| 2012/0310365 A1 | 12/2012 | Chaput et al. | |
| 2013/0249146 A1 | 9/2013 | Zenere et al. | |
| 2013/0292862 A1 | 11/2013 | Joyce | |
| 2013/0304233 A1 | 11/2013 | Dean et al. | |
| 2014/0131908 A1 | 5/2014 | Sun | |
| 2014/0163717 A1 | 6/2014 | Das et al. | |
| 2014/0183799 A1 | 7/2014 | Fischer | |
| 2014/0227382 A1 | 8/2014 | Liska et al. | |
| 2014/0308624 A1 | 10/2014 | Lee et al. | |
| 2014/0361463 A1 | 12/2014 | DeSimone et al. | |
| 2015/0071809 A1 | 3/2015 | Nordkvist et al. | |
| 2015/0072293 A1 | 3/2015 | DeSimone et al. | |
| 2015/0097315 A1 * | 4/2015 | DeSimone | B33Y 50/02 |
| | | | 264/401 |
| 2015/0097316 A1 | 4/2015 | DeSimone et al. | |
| 2015/0102532 A1 | 4/2015 | DeSimone et al. | |
| 2015/0131074 A1 | 5/2015 | Ebert et al. | |
| 2015/0182321 A1 | 7/2015 | Karazivan | |
| 2015/0258732 A1 | 9/2015 | Stampfl et al. | |
| 2016/0136889 A1 | 5/2016 | Rolland | |
| 2016/0263838 A1 | 9/2016 | Goldman et al. | |
| 2016/0325493 A1 * | 11/2016 | DeSimone | B29C 64/129 |
| 2016/0332386 A1 | 11/2016 | Kuijpers | |
| 2016/0376460 A1 | 12/2016 | Fukushi et al. | |
| 2017/0260347 A1 | 9/2017 | Lee et al. | |

FOREIGN PATENT DOCUMENTS

| | | |
|---|---|---|
| CN | 103980690 A | 8/2014 |
| CN | 104015363 A | 9/2014 |
| CN | 104085106 A | 10/2014 |
| CN | 104093547 A | 10/2014 |
| CN | 104691478 A | 5/2015 |
| CN | 104842565 A | 8/2015 |
| CN | 106634208 A | 5/2017 |
| DE | 29911122 U1 | 9/1999 |
| DE | 102017203885 A1 | 9/2017 |
| EP | 3341342 A1 | 7/2018 |
| ES | 2424738 T3 | 10/2013 |
| FR | 2990860 A1 | 11/2013 |
| JP | H06262693 A | 9/1994 |
| JP | 2007502713 A | 2/2007 |
| JP | 2007246714 A | 9/2007 |
| JP | 2010259804 A | 11/2010 |
| JP | 2012056323 A | 3/2012 |
| JP | 5480907 B2 | 4/2014 |
| JP | 5571917 B2 | 8/2014 |
| JP | 2016505525 A | 2/2016 |
| KR | 101407048 B1 | 6/2014 |
| WO | 1998006560 A1 | 2/1998 |
| WO | 2000042471 A1 | 7/2000 |
| WO | 2001072501 A1 | 10/2001 |
| WO | 2008005327 A2 | 1/2008 |
| WO | 2011098609 A1 | 8/2011 |
| WO | 2012024675 A2 | 2/2012 |
| WO | 2012053895 A1 | 4/2012 |
| WO | 2012129968 A1 | 10/2012 |

(56) References Cited

FOREIGN PATENT DOCUMENTS

| | | | |
|---|---|---|---|
| WO | 2013093612 | A1 | 6/2013 |
| WO | 2014126834 | A2 | 8/2014 |
| WO | 2014126837 | A2 | 8/2014 |
| WO | 2015080888 | A2 | 6/2015 |
| WO | 2015142546 | A1 | 9/2015 |
| WO | 2016007495 | A1 | 1/2016 |
| WO | 2017014784 | A1 | 1/2017 |
| WO | 2017032842 | A1 | 3/2017 |
| WO | 2017059866 | A2 | 4/2017 |
| WO | 2017066584 | A1 | 4/2017 |
| WO | 2017112682 | A1 | 6/2017 |
| WO | 2017127561 | A1 | 7/2017 |
| WO | 2017127569 | A1 | 7/2017 |
| WO | 2017127572 | A1 | 7/2017 |
| WO | 2017192859 | A2 | 11/2017 |
| WO | 2017043381 | A1 | 6/2018 |

OTHER PUBLICATIONS

"Polyflon PTFR D-610C Technical Information," Daikin, 2015, 1 page.
"PTFE D-610C Technical Data Sheet," Daikin, 2016, 1 page.
"Ciba® Irgacure® 819," Ciba Specialty Chemicals—Coating Effects Segment, 2001, 3 pages.
Rachel Gordon, "Will PTFR be the next 3D printable material?" idtechex.com, 2016, 3 pages.
"PTFE D-210C Dispersion Technical Data Sheet," Daikin, 2016, 1 page.
Daikin Polyflon™ PTFE Products—Product Information Guide for Aqueous Dispersions, Fine Powders, Granular Molding Powders, 2016, 8 pages, Daikin America, Inc.
Christophe Chaput, "Ceramic 3D printing technology to meet most complex specifications," 3D Ceram Advanced Ceramics, 17 pages.
Michiel de Brujicker, "ADMATEC Additive Manufacturing Technologies," 2015, 26 pages.
Jaco Saurwalt et al., "ADMATEC Additive Manufacturing Technologies—Additive Manufacturing of Ceramics," 2014, 27 pages.
Nahum Travitzky et al., "Additive Manufacturing of Ceramic-Based Materials," Advanced Engineering Materials, 2014, pp. 729-754, vol. 16, No. 6.
"Ceramic Suspension Rheology," Fundamentals of Ceramic Powder Processing and Synthesis, 1996, p. 559.
"Carbon3D introduces breakthrough CLIP technology for layerless 3D printing, 25-100x faster," 3Ders.org, 2015, 3 pages.
Simon last name unknown, "Chinese company Prismlab unveils super-fast SLA 3D printer, can print 2,712 cm3 in just 1 hour," 3Ders.org, 2015, 5 pages.
Alec last name unknown, New Gizmo 3D's super-fast DLP 3D printer creates objects in 6 minutes, 3Ders.org, 2015, 8 pages.
Michael Molitch-Hou, "Autodesk Pours $10 Million into Carbon3D's ultra-fast 3D printing technology," 3dprintingindustry.com, 2015, 5 pages.
Davide Sher, "Bo Pang's Continuous DLP Technology is Taking Ultra Fast 3D Printing to the Masses," 3dprintingindustry.com, 2015, 4 pages.
Andrew Wheeler, "Breakthrough! Layerless 3D Printing! 25-100x Faster Prints!" 3dprintingindustry.com, 2015, 5 pages.
Michelle L. Griffith et al., "Freeform Fabrication of Ceramics via Stereolithography," Journal of the American Ceramic Society., 1996, pp. 2601-2608, vol. 79, No. 10.
J. Deckers et al., "Additive Manufacturing of Ceramics: A Review," Journal of Ceramic Science and Technology, 2014, pp. 245-260, vol. 5, No. 4.
Zak C. Eckel et al., "Additive manufacturing of polymer-derived ceramics," Science Magazine, 2016, pp. 58-62, vol. 351, No. 6268.
Xiaoyu Zheng et al., "Ultralight, Ultrastiff Mechanical Metamaterials," Science Magazine, 2014, pp. 1373-1377, vol. 344, No. 6190.
John R. Tumbleston et al., "Supplementary Materials—Continuous liquid interface production of 3D objects," Science Magazine, 2015, 13 pgs, vol. 347.
John R. Tumbleston et al., "Continuous liquid interface production of 3D objects," Science Magazine, 2015, 7 pgs, vol. 347.
"Printing Ceramic Parts Using the New Ceramaker 3D Printer," DKG, 2014, p. E13, No. 8.
Johannes Homa, "Additive manufacturing of high-performance ceramics," lithoz.com, 2015, 17 pages.
International Search Report and Written Opinion for PCT/US2016/057061, mailed Dec. 29, 2016, 15 pages.
T. Chartier et al., "Additive Manufacturing to Produce Complex 3D Ceramic Parts," Journal of Ceramic Science and Technology, 2015, pp. 95-104, vol. 6, No. 02.
Christophe Chaput et al., "Fabrication of ceramics by stereolithography," Rtejournal, 16 pages.
International Search Report and Written Opinion for PCT/US2018/043122, mailed Oct. 31, 2018, 16 pages.
Maciej Wozniak et al., "Highly loaded UV curable nanosilica dispersions for rapid prototyping applications," Journal of the European Ceramic Society, 2009, pp. 2259-2265, vol. 29, Iss. 11.
Yayue Pan et al., "Fast Recoating Methods for the Projection-based Stereolithography Process in Micro- and Macro-scales," Comput. Des., 2015, pp. 846-872.
W. Zhou et al., "Direct fabrication of an integral ceramic mould by stereolithography," Proc. IMechE, 2009, pp. 237-243, vol. 224, Part B: J. Engineering.
C. Hinczewski et al., "Ceramic suspensions suitable for stereolithography," Journal of the European Ceramic Society, 1998, pp. 583-590, vol. 18, Iss. 6.
Maciej Wozniak et al., "Rheology of UV curable colloidal silica dispersions for rapid prototyping applications," 2011, pp. 2221-2229, vol. 31, Iss. 13.
Johannes Homa et al., "A Novel Additive Manufacturing Technology for High-Performance Ceramics," Advanced Processing and Manufacturing Technologies for Nanostructured and Multifunctional Materials, 2015, pp. 153-162.
Gerald Mitteramskogler et al., "Light curing strategies for lithography-based additive manufacturing of customized ceramics," Additive Manufacturing, 2014, pp. 110-118.
Chang-Jun Bae et al., "Influence of Residual Monomer on Cracking in Ceramics Fabricated by Stereolithography," International Journal of Applied Ceramic Technology, 2011, pp. 1289-1295, vol. 8, Iss. 6.
Howard Barnes, "A Review of the Rheology of Filled Viscoelastic Systems," Rheology Reviews, 2003, pp. 1-36, The British Society of Rheology.
Howard Barnes, "An appreciation and critique of the suspension rheology research," Appl. Rheol., 2000, pp. 248-253, vol. 10, Iss. 5.
S. Mueller et al., "The rheology of suspensions of solid particles," Proceedings of the Royal Society, 2009, pp. 1201-1228, vol. 466.
Sundaram Gunasekaran et al., "Dynamic oscillatory shear testing of foods—selected applications," Trends in Food Science & Technology, 2000, pp. 115-127, vol. 11.
Hongmei Liao, "Stereolithography Using Compositions Containing Ceramic Powders," 1997, thesis submitted to University of Toronto.
Vladislava Tomeckova et al., "Predictive models for the photopolymerization of ceramic suspensions," Journal of the European Ceramic Society, 2010, pp. 2833-2840, vol. 30. Iss. 14.
Vladislava Tomeckova et al., "Cure depth for photopolymerization of ceramic suspensions," Journal of the European Ceramic Society, 2010, pp. 3023-3033, vol. 30.
Rajeev Garg et al., "Absorption length for photon propagation in highly dense colloidal dispersions," Journal of Materials Research, 1998, pp. 3463-3467, vol. 13, No. 12.
Jeffrey Eldridge et al., "Determination of Scattering and Absorption Coefficients for Plasma-Sprayed Yttria-Stabilized Zirconia Thermal Barrier Coatings at Elevated Temperatures," 2009, Journal of the American Ceramic Society, pp. 2276-2285, vol. 92, Iss. 10.
R. Zallen et al., "The optical absorption edge of brookite TiO2," Solid State Communications, 2006, pp. 154-157, vol. 137.
Herbert Philipp, "Optical Properties of Silicon Nitride," Journal of the Electrochemical Society, 1973, pp. 295-300, vol. 120, Iss. 2.
Lyle Patrick et al., "Optical Absorption in n-Type Cubic SiC," Physical Review Journals, 1969, pp. 775-777, vol. 186, Iss. 3.

(56) References Cited

OTHER PUBLICATIONS

Michelle Griffith et al., Scattering of ultraviolet radiation in turbid suspensions, Journal of Applied Physics, 1997, pp. 2538-2546, vol. 81, No. 6.

Y. Abouliatim et al., "Optical characterization of stereolithography," Journal of the European Ceramic Society, 2009, pp. 919-924, vol. 29, Iss. 5.

K. Wu et al., "Prediction of ceramic stereolithography resin sensitivity from theory and measurement of diffusive photon transport," Journal of Applied Physics, 2005, pp. 024902-1-024902-10, vol. 98.

Vladislava Tomeckova et al., "Critical energy for photopolymerization of ceramic suspensions in acrylate monomers," Journal of the American Ceramic Society, 2010, pp. 3273-3282, vol. 30.

International Search Report and Written Opinion for PCT/US2017/031077, mailed Jul. 24, 2017, 14 pages.

Gregory Smith et al., "Magnetically-responsive electrophoretic silica organosols," Journal of Colloid and Interface Science, 2014, pp. 252-255, vol. 426.

Scott Grunewald, "The Carima C-CAT DLP 3D Printer Can Print at a Blistering 1cm per minute," 3dprint.com, 2015, 3 pages.

M. Riccardis, "Ceramic Coatings Obtained by Electrophoretic Deposition: Fundamentals, Models, Post-Deposition Processes and Applications," Ceramic Coatings—Applications in Engineering, 2012, pp. 43-68, InTech.

"Our Process," nexa3d.com, accessed Apr. 13, 2016, 3 pages. https://nexa3d.com/process/.

"Electrophoretic deposition," wikipedia.org, last edited Sep. 5, 2018, 5 pages. https://en.wikipedia.org/wiki/Electrophoretic_deposition.

"E Ink," wikipedia.org, last edited Dec. 10, 2018, 7 pages. https://en.wikipedia.org/wiki/E_Ink.

Honsberg et al., "Photovoltaics: Devices, Systems and Applications," 1998, PVCDROM, The University of New South Wales.

Vincent, "Basic Elasticity and Viscoelasticity," Structural Biomaterials, 2008, pp. 1-28, Princeton University Press.

Tumbleston et al. "Continuous liquid interface production of 3D objects". Science 347, 1349 (2015) Year: 2015).

\* cited by examiner

METHOD FOR FORMING A THREE DIMENSIONAL BODY FROM A MIXTURE WITH A HIGH CONTENT OF SOLID PARTICLES

CROSS-REFERENCE TO RELATED APPLICATION(S)

This application is a National Stage entry under 35 U.S.C. § 371 of International Application PCT/US2016/057061, filed Oct. 14, 2016, entitled "METHOD FOR FORMING A THREE DIMENSIONAL BODY FROM A MIXTURE WITH A HIGH CONTENT OF SOLID PARTICLES," by Paul W. REHRIG et al., which claims priority to U.S. Provisional Patent Application No. 62/242,150 filed Oct. 15, 2015, entitled "METHOD FOR FORMING A THREE DIMENSIONAL BODY FROM A MIXTURE WITH A HIGH CONTENT OF SOLID PARTICLES," by Paul W. REHRIG et al., which all applications are assigned to the current assignee hereof and incorporated herein by reference in their entireties.

TECHNICAL FIELD

The present disclosure relates to a method for continuously forming a three-dimensional body from a mixture, the mixture comprising solid particles and a radiation curable material.

BACKGROUND ART

The manufacturing of polymeric three-dimensional bodies based on a layer by layer built up of a radiation curable liquid material has become of increasing interest, especially in view of the enhancement in production speed if a bottom-up technique is employed.

Although it is known that ceramic bodies may also be manufactured via a layer by layer construction of radiation curable ceramic slurries, the production speed for making these materials is still very slow and improvement of the uniformity, density and strength of manufactured ceramic bodies is desirable. The manufacturing of complex three dimensional structures including ceramic can find applications in a wide range of fields, for example, in the automotive and aerospace industry, or in medicine for the making of custom implants and dental models.

SUMMARY

According to one embodiment, a method of forming a body comprises forming a three-dimensional body from a mixture, the mixture comprising at least 15 vol % of solid particles for a total volume of the mixture and a radiation-curable material, wherein forming includes continuous translation and growth of the body from an interface of the mixture.

According to another embodiment, a method of forming a body comprises providing an assembly including a chamber containing a mixture and a construction; forming a three-dimensional body by continuously creating and attaching a radiation cured translating portion to a carrier plate of the construction and increasing a distance between the carrier plate and the mixture in a continuous manner to create a three-dimensional body within the mixture, wherein during forming the three-dimensional body is adjacent to an interface of an inhibition zone of the mixture. The mixture comprises a mixture characteristic selected from the group of a shear-thinning slurry; a shear-thinning slurry with a radiation-curable material; a content of solid particles of at least 15 vol % for a total volume of the mixture; a yield point of less than 10 Pa; a viscosity of at least 50 cP at a shear rate of less than about 5 Hz, and a viscosity of less than 1000 cP at a shear rate greater than about 25 Hz; or a combination thereof.

According to a further embodiment, a method of forming a body comprises forming a three-dimensional body using an additive manufacturing process, the three-dimensional body having a content of ceramic particles of at least 15 vol % for a total volume of the three-dimensional body, wherein the three-dimensional body has a total volume of at least 0.1 mm$^3$, and wherein creating is completed at a rate of at least 25 mm/hr.

BRIEF DESCRIPTION OF THE DRAWINGS

The present disclosure may be better understood, and its numerous features and advantages made apparent to those skilled in the art by referencing the accompanying drawings.

DETAILED DESCRIPTION OF THE PREFERRED EMBODIMENT(S)

Figure 1A:
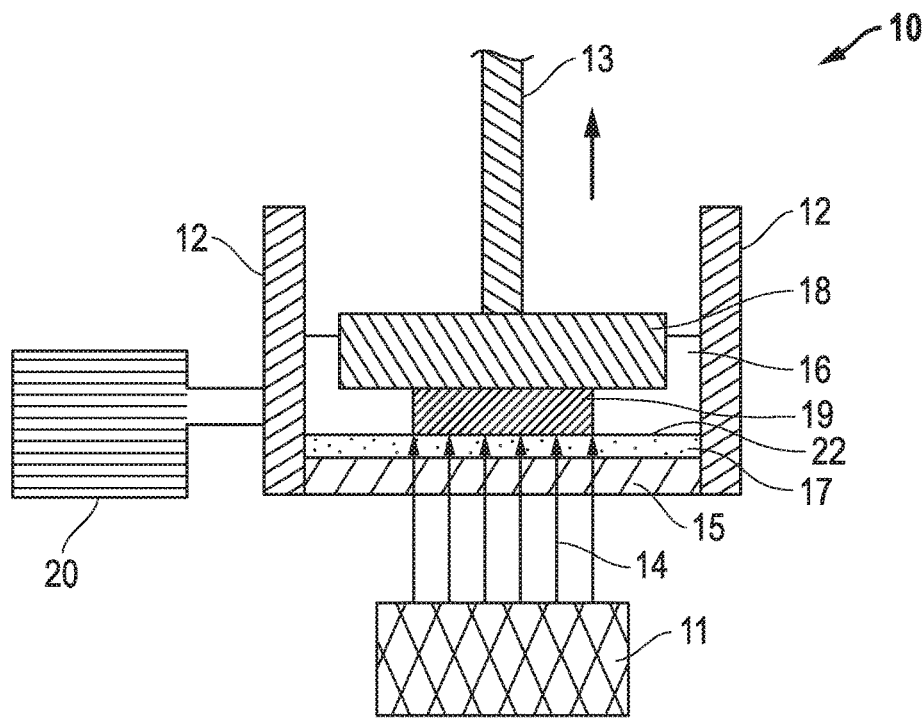
FIG. 1A includes an illustration of an assembly according to one embodiment, showing the starting phase of forming of a three-dimensional body.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus.

As used herein, and unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

As used herein, the term mixture refers to a fluid of a certain viscosity, including a liquid component and solid particles. The liquid component may include a radiation curable material.

As used herein, the term three dimensional body refers to a body containing radiation cured resin and at least 15 vol % solid particles based on the total volume of three dimensional body. In the embodiments that the solid particles are ceramic particles, the three dimensional body is also called green body as a synonymous expression, as long it is before the stage of high temperature sintering (before removal of the cured resin).

Various embodiments of the present disclosure will now be described, by way of example only, with reference to the accompanying drawings.

The present disclosure relates to a method of continuously forming a three-dimensional body from a mixture. The mixture can comprise solid particles in an amount of at least 15 vol % and a liquid radiation-curable material, wherein the forming includes continuous translation and growth of the three-dimensional body from an interface of the mixture.

The method includes providing an assembly designed for working with radiation curable mixtures containing a particular concentration of solid particles. As demonstrated in the embodiment shown in FIG. 1A, the assembly can have a computer controlled electromagnetic radiation unit (11), a chamber (12), and a construction unit (13). The electromagnetic radiation unit (11) can include a UV or visible light (14) emitting radiation source, for example, a laser or a light emitting diode (led) and may project a varying CAD/CAM created two-dimensional image onto a transparent window (15) at the bottom of the chamber (12). The chamber (12) can include a mixture (16) that can include a radiation curable material and solid particles. The transparent window (15) of the chamber can also be semipermeable for an inhibitor gas or may include an additional semipermeable layer (not shown) for the penetration of an inhibitor, for example oxygen, into the mixture (16) of the chamber (12). During the forming process, the inhibitor may enter the chamber (12) by permeating the transparent window (15) and form an inhibition zone (17) at a bottom region of the mixture (16). In the inhibition zone (17) the inhibitor can limit or prevent curing of the mixture (16) by the electromagnetic radiation.

According to one embodiment, a carrier plate (18) can be positioned above the chamber (12). The position between the carrier plate (18) and the mixture in the chamber (12) can be changed during the forming process to facilitate formation of the three-dimensional body. When the formation of the three-dimensional body is started, the carrier plate (18) can be emerged into the mixture (16) up to a pre-calculated distance from the interface of the inhibition zone (22). According to one embodiment, the pre-calculated distance corresponds to a portion of the mixture that can be radiation cured (translated from liquid to solid state) if subjected to electromagnetic radiation from the radiation unit (11) underneath the chamber (12), and is furtheron called "translating portion" (19). The radiation cured translating portion (19) can adhere to the carrier plate (18) and be vertically moved away from the interface of the inhibition zone (22). Concurrently with the upwards movements of the carrier plate (18) and the attached solidified translating portion (19), mixture (16) from the sides of the polymerization chamber or from a reservoir (20) can fill the released space. The construction is designed to move the carrier plate (18) continuously upwards in z direction at a speed that corresponds to the time needed for radiation curing mixture (16) that replaces the upwards moved solidified translating portion.

Figure 1B:
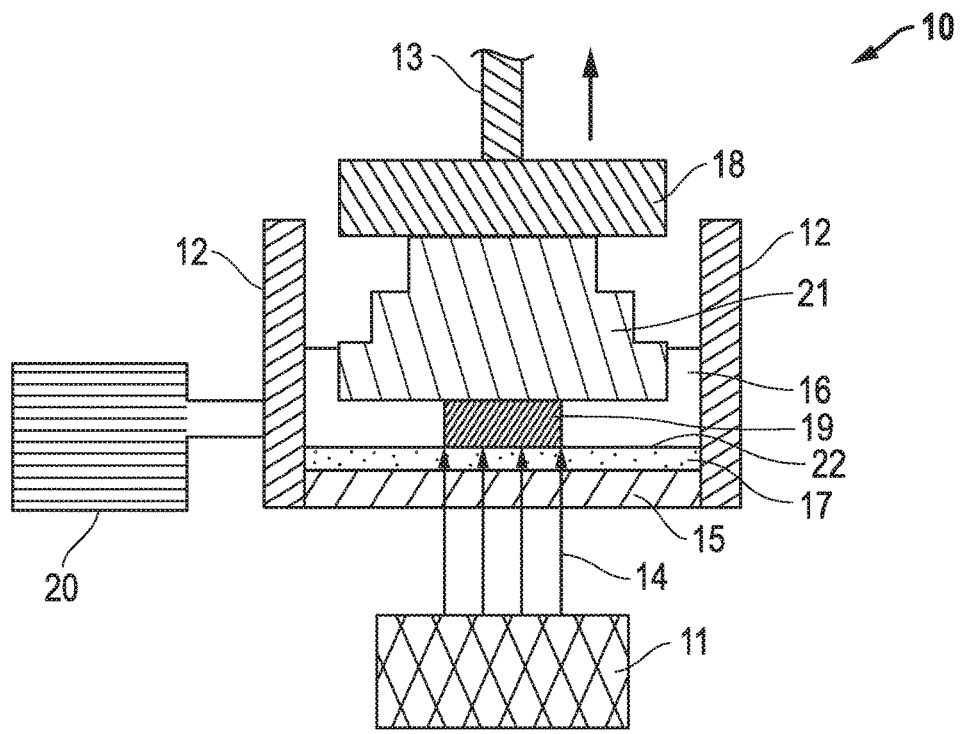
FIG. 1B includes an illustration of an assembly according to one embodiment, showing a later phase of forming of a three-dimensional body.

FIG. 1B demonstrates an embodiment including a partially formed three-dimensional body (21) having three solidified and unified translating portions and one translating portion (19) which is subjected to radiation curing and attached to the three-dimensional body (21).

The increase in distance between the carrier plate (18) and the mixture (16) when forming the three-dimensional body (21) can be caused by moving either the carrier plate (18) or the chamber (12) or both carrier plate (18) and chamber (12) in relation to each other.

The carrier plate (18) of the assembly of the present disclosure is configured for continuous movement to facilitate formation of the three-dimensional body away from the interface of the inhibition zone (22). As used herein, the phrase "interphase of the inhibition zone" (22) can be used interchangeable with the phrase "interface of the mixture," since the inhibition zone is a zone of the mixture, which only distinguishes from the other part of the mixture by the presence of an inhibitor in a concentration that the mixture may not cure if exposed to electromagnetic radiation. Actual solidification and forming of the three dimensional body starts at the interface of the inhibition zone (22), i.e., an interface of the mixture.

The formation of the three dimensional body may not necessarily be considered a layer-by-layer forming process. Instead, the forming process (e.g., curing) may be in the form of a gradient of solidification (e.g., polymerization). The processes of the embodiments herein may facilitate formation of a three-dimensional body having smoother features and may have improved mechanical properties, compared to conventional structures formed by layer-by-layer forming processes.

As used in the context of the present disclosure, continuous translation and growth of the three-dimensional body means that the carrier plate (18) can be moved in a continuous manner or in discrete steps with short stops between each step, as long the stops allow that a gradient of solidification is maintained while forming the three-dimensional body. A gradient of solidification means that especially in the translating portion (19) a continuous polymerization reaction is maintained, with the highest degree of solidification at the farthest distance to the inhibition zone. The three-dimensional body formed by the process of continuous translation can thereby possess a non-layered internal structure, such that in a crosscut along the z-axis, changes in the morphology of the green body are not visible to the naked eye. In comparison, traditional layer by layer build-up of a green body waits until one layer is completely radiation cured before the next layer is applied, which leaves visible cleavage lines in the formed green body, i.e., regions that are not smoothly connected together.

In embodiments, the stops in the movement of the carrier plate (18) while conducting continuous translation and forming of the three-dimensional body can be at least 1 microsecond, such as at least 300 microseconds, at least 500 microseconds, at least 800 microseconds, or at least 1000 microseconds. In other embodiments, the stops during continuous translation may be not longer that 1 second, such as not longer than 0.5 seconds, not longer than 0.3 seconds, not longer than 0.2 seconds, or not longer than 0.1 seconds. It will be appreciated that the stops during continuous translation can be a value within any of the minimum and maximum values note above, such as from 1 microsecond to 1 second, from 300 microseconds to 0.5 second, or from 1000 microseconds to 0.1 seconds.

In further embodiments, the method of the present disclosure can also include one or more longer stops during the forming of the three-dimensional body, such that the gradient of solidification may be interrupted and the translation is not continuous as defined above. Such longer stops may be desired for the making of a body having defined regions which are cleavable.

The cure depth of the electromagnetic radiation (14) applied to the mixture (16) may be effected by the size, type, and concentration of the solid particles and the refractive index of the particle slurry. Notably, the size and concentration of the solid particles may be particularly selected to facilitate proper operation of the process in combination with the type of electromagnetic radiation used for the curing process.

According to an embodiment, suitable formation of a three-dimensional body having a suitable strength, can include controlling the cure depth relative to a thickness of the translating portion. In one embodiment, the cure depth may be at least 25% larger than the thickness of the translating portion (19), such as at least 30%, at least 35%, or at least 40%. In another embodiment, the cure depth can be not greater than 75% of the thickness of the translating portion (19), such as not greater than 70% or not greater than 65%. It will be appreciated that the cure depth can be a value between any of the maximum and minimum values noted above, such as from 25% to 75%, from 30% to 70% or from 35% to 60% of the thickness of the translating portion (19).

In one embodiment, a thickness of the translating portion (19) can be at least 50 μm, such as at least 70 μm, or at least 100 μm. In another embodiment, the thickness of the translating portion may be not greater than 500 μm, such as not greater than 450 μm, or not greater than 400 μm. It will be appreciated that the thickness of the translating portion can be a value between any of the maximum and minimum values note above, such as from 50 μm to 500 μm, from 80 μm to 450 μm, or from 100 μm to 300 μm.

In a further aspect, the cure depth may be at least 1 μm larger than the thickness of the inhibition zone (17), such as at least 5 μm, at least 10 μm, at least 20 μm, or at least 50 μm larger than the thickness of the inhibition zone. In yet another aspect, the cure depth can be not greater than 400 μm than the thickness of the inhibition zone, such as not greater than 350 μm, not greater than 300 μm, or not greater than 250 μm than the thickness of the inhibition zone. It will be appreciated that the cure depth can be a value between any of the maximum and minimum values noted above, such as within a range of at least 1 μm to not greater than 400 μm, from 5 μm to 370 μm, or from 30 μm to 300 μm larger than the thickness of the inhibition zone.

The thickness of the inhibition zone (17), which can be formed when the inhibitor enters the chamber (12) through the transparent and semipermeable window, (15) may be regulated by the concentration of the inhibitor. The inhibition zone (17) may limit the curing of the mixture (16) in that zone within the chamber (12). The inhibition zone (17) may facilitate limited or no adhesion of the radiation cured material to the bottom of the chamber (12), which may further facilitate simpler release of the body from the chamber after forming is completed.

Figure 2A:
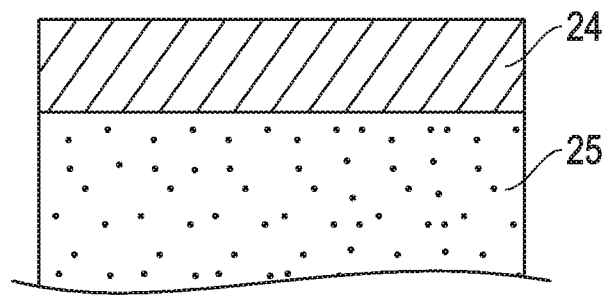
FIG. 2A includes an illustration of a bottom portion of the assembly according to one embodiment.
Figure 2B:
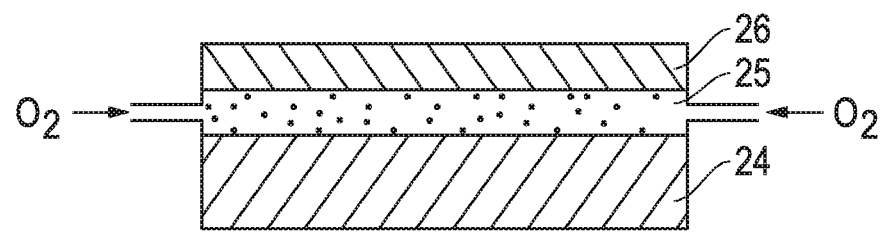
FIG. 2B includes an illustration of a bottom portion of the assembly according to an embodiment.

FIGS. 2A and 2B show embodiments how a semipermeable layer can be integrated at the bottom section of the chamber. In the embodiment of FIG. 2A, the transparent window (24) functions also as a semipermeable layer for the penetration of the inhibitor gas (25), penetrating the transparent window (24) from the bottom of the chamber. FIG. 2B shows an embodiment where an additional semipermeable layer (26) is installed above the transparent window (24) and the inhibitor gas (25) is provided from the sides of the polymerization chamber.

In one embodiment, the thickness of the semipermeable layer for the penetration of inhibitor gas can be at least about 1 μm, such as at least about 5 μm, at least about 50 μm, at least about 500 μm, or at least about 1000 μm. The upper thickness of the semipermeable layer may not be limited as long the layer allows sufficient transport of inhibitor gas.

The material of the semipermeable layer may be any material that permits the penetration of inhibitor gas. Non-limiting examples of materials suitable for a semipermeable layer can include, for example, fluoropolymers, such as Teflon (e.g., AF-2400X), polymethylpentene based membranes (PMP), or silicone polymers and copolymers.

The inhibitor may preferably be an oxygen containing gas, such as air, mixtures of an inert gas and oxygen, or pure oxygen. In another aspect, when oxygen cannot inhibit the activity of the photoinitiator (for example, when a cationic photoinitiator is used) the inhibitor can be an amine, e.g., ammonia, ethyl amine, di and trialkyl amines, carbon dioxide, or combinations thereof.

In one embodiment, the inhibitor can be pure oxygen, and the oxygen may penetrate the semipermeable layer in an amount of at least 0.1 Barrer, such as at least 1 Barrer, at least 5 Barrer, at least 10 Barrer, or at least 30 Barrer.

The thickness of the inhibition zone should be at least in the range of the average size of the solid particles contained in the mixture or greater. In one embodiment, the thickness of the inhibition zone may be at least 0.5 µm, such as at least 1.0 µm, at least 2.0 µm, or at least 5 µm. In another embodiment, the inhibition zone may not be greater than 600 µm, such as not greater than 500 µm, not greater than 300 µm, or not greater than 100 µm. It will be appreciated that the thickness of the inhibition zone can be a value between any of the maximum and minimum values noted above, such as from 0.5 µm to 600 µm, from 1.0 µm to 450 µm, or from 3 µm to 200 µm.

Although the term "inhibition zone" appears to indicate that no polymerization reaction may take place in that area of the mixture, it will be appreciated that polymerization reactions can also occur to a limited extent in the inhibition zone. The inhibition zone may be also described as a gradient of polymerization, where with increasing distance from the bottom surface of the chamber larger amounts of polymerization reactions can happen, but these polymerization reactions may not completely cure the mixture, and the mixture is still maintained in a liquid stage. The interface of the inhibition zone may be understood as the area of the inhibition zone where the polymerization reactions start to form a solid material.

The solid particles contained in the mixture can be any type of inorganic or organic particles that do not dissolve in the liquid component of the mixture under the forming conditions, and may be uniformly distributed throughout the entire mixture. In one aspect, the solid particles can be ceramic particles, metallic particles, polymeric particles, or any combination thereof.

In a particular embodiment, the solid particles can be ceramic particles, such as an oxide, a carbide, a boride, a nitride, a silicide or any combination thereof. Non-limiting examples or ceramic particles can be alumina, ceria, zirconia, silica, magnesium-magnesia aluminate (MMA), magnesium oxide, silicon nitride, silicon carbide, hydroxyapatite, cordierite, or any combination thereof. In a particular embodiment, the ceramic particles are alumina, silica, MMA, or zirconia.

The concentration of the solid particles in the mixture can be in a range that a percolated network be formed and that the created three-dimensional body can be densified without falling apart upon burnout of the binder. In one embodiment, the concentration of solid particles can be at least 15 vol %, such as at least 16 vol %, at least 18 vol %, at least 20 vol %, at least 25 vol %, or at least 30 vol %. In another embodiment, the particle concentration can be not greater than 80 vol %, such as not greater than 75 vol %, not greater than 70 vol %, or not greater than 65 vol %. It will be appreciated that the concentration of solid particles can be a value between any of the maximum and minimum values noted above, such as from 16 vol % to 80 vol %, from 20 vol % to 75 vol %, or from 30 vol % to 65 vol %.

The solid particles contained in the mixture can have an average particle size of at least 0.1 µm, such as at least 0.5 µm, at least 1.0 µm, or at least 5 µm. In another aspect, the solid particles can have an average particle size of not greater than 20 µm, such as not greater than 18 µm, or not greater than 15 µm. It will be appreciated that the average size of the solid particles can be a value between any of the maximum and minimum values noted above, such as from 0.1 µm to 20 µm, 0.3 µm to 18 µm, or 0.5 µm to 15 µm.

In one embodiment, the solid particles may have a multimodal particle distribution, for example, a bimodal or trimodal particle distribution.

In order to provide a high quality of the formed three-dimensional body of the present disclosure, it can be advantageous if solid particles that exceed a certain particle size or particles that have a size below a certain minimum be excluded. In one embodiment, the solid particles may have a particle size distribution wherein a value of function (d50–d10)/d50 is less than 0.8. In another embodiment, the solid particles may have a particle size distribution wherein a value of function (d90–d50)/d50 is less than 1.0.

In another embodiment, the solid particles contained of the mixture may have an average particle size controlled relative to the thickness dimension of the inhibition zone. In a preferred aspect, an average particle size of the solid particles may not be greater than 25% of the thickness of the inhibition zone, such as not greater than 20%, not greater than 15%, or not greater than 10% of the thickness of the inhibition zone.

In one embodiment, the mixture can contain at least 20 vol % to 40 vol % ceramic particles and may be radiation cured with UV radiation having an energy of at least 30 mJ/cm$^2$ and not greater than 200 mJ/cm$^2$.

The radiation curable material contained in the mixture can comprise polymerizable monomers, polymerizable oligomers and one or more photoinitiators. In a preferred aspect, the radiation curable material can contain polymerizable monomers and at least one photoinitiator. Suitable polymerizable monomers can be, for example, acrylates, acrylamides, urethanes, dienes, or combinations thereof.

The photoinitiator can be a free-radical photoinitiator or a cationic photoinitiator. In a preferred aspect, a free-radical photoinitiator can be employed, which can be inhibited by the presence of oxygen. Non-limiting examples of free-radical photoinitiators can include peroxides, such as acetyl, benzoyl, t-butyl peroxides, ketones or phosphine oxides, such as IRGACURE 819 (bis(2,4,6-trimethylbenzoyl)-phenylphosphineoxide), ESSTECH TPO (2,4,6-trimethylbenzoyl)-phenylphosphineoxide) or a combination thereof.

In an embodiment where a cationic photoinitiator is used, the photopolymerization generally tends to be slower and cannot be inhibited by oxygen. In this aspect, instead of oxygen as inhibitor, a Bronsted acid or Lewis acid, such as metal halides and their organometallic derivatives can be employed and released from the bottom window of the polymerization chamber to form an inhibition zone.

The mixture comprising the solid particles and the radiation curable material can be subjected to electromagnetic radiation having a wavelength in a range from 200 nm to 760 nm, depending from the activation energy of the selected photoinitiator. In a preferred aspect, the range of the electromagnetic radiation may be from 370 nm to 450 nm, or from 380 nm to 410 nm.

In embodiments, the electromagnetic radiation can be created by a laser, a light emitting diode (led), or by electron beam radiation.

In one embodiment, the electromagnetic radiation applied for curing the mixture can have an energy of at least 20 mJ/cm$^2$, such as at least 30 mJ/cm$^2$, at least 50 mJ/cm$^2$ or at least 80 mJ/cm$^2$. In another embodiment, the electromagnetic radiation can have an energy not greater than 450 mJ/cm$^2$, such as not greater than 400 mJ/cm$^2$, not greater than 350 mJ/cm², not greater than 300 mJ/cm², not greater than 250 mJ/cm², not greater than 200 mJ/cm², or not greater than 100 mJ/cm². It will be appreciated that the electromagnetic radiation energy can be a value between any of the maximum and minimum values noted above, such as from 20 mJ/cm² to 450 mJ/cm², from 30 mJ/cm² to 300 mJ/cm², from 40 mJ/cm² to 200 mJ/cm², or from 20 to 100 mJ/cm².

In a particular embodiment, the method of the present disclosure may cure the mixture in the translation portion (19) during continuous forming of the three dimensional body at a UV power of at least 0.1 mW/cm², such as at least 0.5 mW/cm², at least 1.0 mW/cm², or at least 3.0 mW/cm². In another particular embodiment, the applied UV power during forming may be not greater than 250 mW/cm², such as not greater than 150 mW/cm², not greater than 100 mW/cm², not greater than 50 mW/cm², not greater than 30 mW/cm², not greater than 20 mW/cm², not greater than 13.0 mW/cm², not greater than 12 mW/cm², or not greater than 10 mW/cm². It will be appreciated that the applied UV power can be a value between any of the maximum and minimum values noted above, such as from 0.1 mW/cm² to 250.0 mW/cm², from 1.0 mW/cm² to 100 mW/cm² or from 2.0 mW/cm² to 10 mW/cm².

In a further embodiment, the thickness dimension of the inhibition zone can be controlled relative to the concentration of the solid particles. By increasing the concentration of the solid particles, the thickness of the inhibition zone may be decreased, as also shown in Example 2.

In another embodiment, the solid particles contained in the mixture can include a coating overlying an exterior surface of the particles. The coating can partially or completely cover the surface of the solid particles. The coating may be desirable in order to adjust the scattering and/or absorption of an applied electromagnetic radiation in the mixture. In one aspect, the coating can provide a 50% lower scattering of an applied electromagnetic radiation than corresponding uncoated particles. In a further aspect, the coating can lower the radiation scattering by at least 55%, such as at least 60%, at least 70%, at least 80%, at least 90% or at least 95%.

In another aspect, a coating of the solid particles can provide a 50% lower absorbance of an applied electromagnetic radiation absorption than corresponding uncoated particles. In embodiments, the coating can lower the radiation absorbance in the mixture by at least 55%, such as at least 60%, at least 65%, at least 70%, at least 75%, at least 80%, at least 90% or at least 95%.

According to another embodiment of the present disclosure, the mixture may include one or more additives. Non-limiting examples of additives can be additional inhibitors to prevent spontaneous polymerization (inert dyes), plasticizer, dispersing agents, debinding accelerators, cross-linking monomers, pH regulators, a pharmaceutically active ingredient, or any combination thereof.

The rheological properties of the mixture containing solid particles and a radiation curable material may be controlled to facilitate suitable formation of a stable and suitably formed three-dimensional body, including for example, a ceramic green body having sufficient strength to be self-supporting and capable of handling without detrimental deformation. Also, the force required to continuously pull-up the carrier the force utilized to pull the carrier plate away from the chamber may be adjusted based on various parameters, including but not limited to the rheology of the mixture.

In a particular embodiment, the mixture used for forming the three dimensional body according to the present disclosure can be characterized that the viscosity of the mixture decreases with increasing shear rate. Such type of mixture is also called herein a shear thinning slurry. In certain embodiments, the decrease of the viscosity of the mixture from a shear rate of 0.1 s$^{-1}$ to a shear rate of 500 s$^{-1}$ can be at least 10 cP, such as at least 30 cP, at least 50 cP, or at least 80 cP. In other embodiments, the decrease in viscosity from a shear rate of 0.1 s$^{-1}$ to a shear rate of 500 s$^{-1}$ may be not greater than 1500 cP, such as not greater than 1200 cP, not greater than 1000 cP, or not greater than 800 cP. It will be appreciated that the decrease in viscosity from a shear rate of 0.1 s$^{-1}$ to a shear rate of 500 s$^{-1}$ may be a value within any of the maximum and minimum values noted above, such as from 10 cP to 1500 cP, from 50 cP to 700 cP, or from 10 cP to 100 cP.

In another aspect, the yield point of the mixture may be less than 10 Pa, such as less than 8 Pa, less than 5 Pa, or less than 3 Pa at room temperature.

In a further aspect, the mixture may have a low shear viscosity to prevent particle settling over the duration of the forming of the three-dimensional body. Furthermore, the solid particles contained in the slurry may be uniformly dispersed throughout the radiation curable material when electromagnetic radiation is conducted such that that the three-dimensional body can shrink uniformly during sintering. Non-uniform distribution of the solid particles may result in undesirable macro-structural or micro-structural features, including for example, undesirable porosity and the like. Under low shear rate may be understood a range of not greater about 5 Hz and at least about 0.001 Hz, with a corresponding viscosity from at least about 50 cP to not greater than about 5000 cP, particularly from at least 70 cP to not greater than 1500 cP. In one aspect, the viscosity at a low shear rate of less than about 5 Hz can be at least 100 cP.

The viscosity at a moderate to high shear rate can enable sufficient spontaneous flow of the mixture between carrier plate and the bottom surface of the polymerization chamber. Under moderate to high shear rate may be understood a shear rate in a range from at least about 25 Hz and not greater than about 3000 Hz, with a corresponding viscosity of the mixture in a range of at least 1 cP and not greater than 1000 cP. In one aspect, the viscosity of the mixture at a moderate to high shear rate of greater than 25 Hz may be less than 1000 cP.

In one embodiment, the mixture may be formed such that the content of agglomerates of the solid particles is limited. In certain embodiments, the mixture can be essentially free of agglomerates of solid particles. Forming a mixture that has limited agglomerates can include heat treatment and milling of the solid particle powder before combining with the other components of the mixture. In embodiments, the solid particle powder can be heat treated at least 90° C., such as at least 100° C. or even at least 105° C.

Other mixing methods may be employed. The mixing process may be controlled to control the level of agglomeration. Moreover, over-mixing may result in degrading of the monomers and generating too much premature polymerization of the radiation curable resin.

In one particular embodiment, the mixture can comprise alumina particles having an average particle size from 100 nm to 5000 nm in an amount of 15 vol % to 50 vol %.

In a certain embodiment, the alumina particles can have an average particle size from 300 nm to 3000 nm and may be present in an amount of 18 vol % to 40 vol %. The alumina containing mixture may be a shear thinning slurry having a viscosity of 1 s$^{-1}$ at a shear rate of not greater than 900 cP 1, and at viscosity of at least 70 cP at a shear rate of 500 s$^{-1}$.

In another embodiment, the mixture can comprise at least 30 vol % alumina and the forming of the three dimensional body may be conducted at an applied UV power of at least 3 mW/cm$^2$ and not greater than 12 mW/cm$^2$.

In a further particular embodiment, the alumina particles can be present the mixture in an amount of 16 vol % to 25 vol %, and the forming of the three dimensional body may be conducted at an applied UV power of at least 1.0 mW/cm$^2$ and not greater than 12 mW/cm$^2$.

In another particular embodiment, the mixture can comprise silica particles having an average particle size from 100 nm to 5000 nm and in an amount of 15 to 40 vol %. In a certain aspect, the silica particles can have an average particle size from 1000 nm to 3000 nm and may be present in an amount of 25 vol % to 35 vol %, wherein the mixture is a shear thinning slurry having a viscosity of not greater than 200 cP at a shear rate of 1 s$^{-1}$ and a viscosity of at least 50 cP at a shear rate of 500 s$^-$.

In a further particular aspect, the method of the present disclosure may employ a mixture comprising at least 25 vol % silica, and the forming of the three dimensional body can be conducted at an applied UV power of at least 1.0 mW/cm$^2$ and not greater than 12 mW/cm$^2$.

According to an embodiment, the mixture may be essentially free of a dye. In this embodiment, the mixture may be formed with solid particles having the proper combination of concentration, average particle size, and coating on the solid particles. A mixture being essentially free of a dye relates to a dye concentration of less than 0.001 vol %. In contrast, radiation curable mixtures which do not contain solid particles and are fully polymer-based, generally require a dye in order to control unwanted photopolymerization.

The total volume of the three-dimensional body created by the process of the present disclosure can be at least 0.1 mm$^3$, such as at least 0.3 mm$^3$, at least 0.5 mm$^3$ or at least 1 mm$^3$. If the process of the present disclosure employs a replenishable reservoir, as shown in FIG. 1, the method may not have a specific upper limit of the total volume of the formed three-dimensional body. For example, in one embodiment, interconnected parts can be formed and directly fed into a furnish, whereby no specific upper limit of the body volume may exist.

The method of the present disclosure can be further characterized by producing three-dimensional bodies from mixtures having a high content of solid particles, whereby the formed bodies can have an exceptional uniform structure, high strength and high smoothness.

In one embodiment, the method of the present disclosure is characterized that a three-dimensional body including ceramic particles can be continuously manufactured at a high production speed. In one aspect, the creating of the three dimensional body can be completed at a speed rate of at least 25 mm/hr, such as at least 30 mm/hr, at least 40 mm/hr, at least 50 mm/hr, or at least 70 mm/hr.

In a particular embodiment, the three dimensional body of the present disclosure can be subjected to high temperature sintering to remove the radiation curable material and to form a sintered body. If the solid particles of three dimensional body subjected to high temperature sintering are ceramic particles, the sintered body is called hereafter a ceramic body.

The sintering temperature can be at least 900° C., such as at least 950° C., at least 1000° C., at least 1050° C., at least 1100° C., or at least 1150° C. In other aspects, the sintering temperature can be not greater than 1600° C., such as not greater than 1550° C., not greater than 1500° C., or not greater than 1400° C. It will be appreciated that the sintering temperature can be a value between any of the minimum and maximum values noted above, such as from 900° C. to 1600° C., from 1000° C. to 1500° C., or from 1100° C. to 1350° C.

In a certain embodiment, the high temperature sintering can lead to a ceramic body having a density of at least 90% of its theoretical density.

In particular embodiments, the ceramic body can consist essentially of ceramic particles. In one aspect the ceramic body may consist essentially of alumina. In another aspect, the ceramic body can consist essentially of silica. Consisting essentially of ceramic particles means that the ceramic body comprises at least 99 wt % ceramic particles based on the total weight of the ceramic body.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

EMBODIMENTS

Embodiment 1

A method of forming a body comprising:
forming a three-dimensional body from a mixture, the mixture comprising at least 15 vol % of solid particles for a total volume of the mixture and a radiation-curable material, wherein forming includes continuous translation and growth of the body from an interface of the mixture.

Embodiment 2

A method of forming a body comprising:
providing an assembly including a chamber containing a mixture and a construction;
forming a three-dimensional body by continuously creating and attaching a radiation cured translating portion to a carrier plate of the construction and increasing a distance between the carrier plate and the mixture in a continuous manner to create a three-dimensional body within the mixture, wherein during forming the three-dimensional body is adjacent to an interface of an inhibition zone of the mixture,
wherein the mixture comprises a liquid characteristic selected from the group of:
a shear-thinning slurry;
a shear-thinning slurry with a radiation-curable material;
a content of solid particles of at least 15 vol % for a total volume of the mixture;
a yield point of less than 10 Pa;
a viscosity of at least 50 cP at a shear rate of less than about 5 Hz, and a viscosity of less than 1000 cP at a shear rate greater than about 25 Hz;
or a combination thereof.

Embodiment 3

The method of embodiments 1 or 2, wherein the radiation-curable material comprises a photoinitiator and a polymerizable monomer.

Embodiment 4

The method of any of embodiments 1 to 3, wherein during forming portions of the mixture are subjected to electromagnetic radiation having a wavelength in a range from 200 nm to 760 nm.

Embodiment 5

The method of embodiment 4, wherein the electromagnetic radiation has a wavelength within a range from at least 370 nm to not greater than 450 nm.

Embodiment 6

The method of embodiments 4 or 5, wherein the electromagnetic radiation has an energy within a range from at least 20 mJ/cm2 to not greater than 450 mJ/cm2.

Embodiment 7

The method of embodiment 6, wherein the electromagnetic radiation has an energy within a range from at least 20 mJ/cm2 to not greater than 200 mJ/cm2.

Embodiment 8

The method of embodiment 7, wherein the electromagnetic radiation has an energy within a range from 20 mJ/cm2 to 100 mJ/cm2.

Embodiment 9

The method of embodiment 3, wherein the photoinitiator comprises a free-radical photoinitiator.

Embodiment 10

The method of embodiment 3, wherein the polymerizable monomer comprises a material selected from the group of acrylates, acrylamides, urethanes, dienes, or a combination thereof.

Embodiment 11

The method of any of the previous embodiments, wherein the solid particles include ceramic particles, metallic particles, polymeric particles, or any combination thereof.

Embodiment 12

The method of embodiment 11, wherein the ceramic particles comprise at least one material selected from the group of an oxide, a carbide, a boride, a nitride, a silicide or a combination thereof.

Embodiment 13

The method of embodiment 12, wherein the ceramic particles comprise at least one material selected from the group of alumina, ceria, zirconia, silica, magnesium-magnesia aluminate (MMA), magnesia, silicon carbide, hydroxyapatite, cordierite, or a combination thereof.

Embodiment 14

The method of any of embodiment 13, wherein the mixture comprises solid particles selected from the group of alumina, silica, MMA, or zirconia.

Embodiment 15

The method of any of the previous embodiments, wherein at least a portion of the solid particles include a coating overlying an exterior surface.

Embodiment 16

The method of embodiment 15, wherein the coated solid particles provide a 50% lower scattering of an applied electromagnetic radiation than corresponding uncoated particles.

Embodiment 17

The method of embodiment 16, wherein the coated solid particles provide a 90% lower scattering of an applied electromagnetic radiation than the corresponding uncoated particles.

Embodiment 18

The method of embodiment 15, wherein the coated solid particles provide a 50% lower absorbance of an applied electromagnetic radiation than corresponding uncoated particles.

Embodiment 19

The method of embodiment 18, wherein the coated solid particles provide a 90% lower absorbance of an applied electromagnetic radiation than the corresponding uncoated particles.

Embodiment 20

The method of any of the previous embodiments, wherein the solid particles have an average particle size of at least 0.1 μm and not greater than 20 μm.

Embodiment 21

The method of any of the previous embodiments, wherein the solid particles have a multimodal particle size distribution.

Embodiment 22

The method of any of the previous embodiments, wherein the solid particles have a particle size distribution comprising a value of function (d50−d10)/d50 of less than 0.8.

Embodiment 23

The method of any of the previous embodiments, wherein the solid particles have a particle size distribution comprising a value of function (d90−d50)/d50 of less than 1.0.

Embodiment 24

The method of embodiments 1 or 2, wherein the mixture comprises an inhibition zone wherein the radiation curable material does not cure if subjected to electromagnetic radiation.

Embodiment 25

The method of embodiment 24, wherein the inhibition zone has a thickness of at least 0.5 µm and not greater than 600 µm.

Embodiment 26

The method of embodiments 24 or 25, wherein forming comprises selecting solid particles having an average particle size relative to a thickness of the inhibition zone.

Embodiment 27

The method of embodiments 24 or 25, wherein forming comprises selecting a concentration of the solid particles in the mixture relative to a thickness dimension of the inhibition zone.

Embodiment 28

The method of embodiment 26, wherein the average particle size of the solid particles is not greater than 25% of the thickness of the inhibition zone.

Embodiment 29

The method of embodiment 28, wherein the average particle size of the solid particles is not greater than 10% of the thickness of the inhibition zone.

Embodiment 30

The method of embodiment 2, wherein the chamber further comprises an oxygen-permeable layer.

Embodiment 31

The method of embodiments 1 or 2, wherein the mixture is essentially free of a dye.

Embodiment 32

The method of any of embodiments 4 to 31, wherein the applied electromagnetic radiation has a power of at least 0.1 mW/cm$^2$, such as at least 0.5 mW/cm$^2$, at least 1.0 mW/cm$^2$, at least 2 mW/cm$^2$, or at least 3 mW/cm$^2$.

Embodiment 33

The method of any of embodiments 4 to 32, wherein the applied electromagnetic radiation has a power not greater than 250 mW/cm$^2$, such as not greater than 100 mW/cm$^2$, not greater than 50 mW/cm$^2$, or not greater than 10 mW/cm$^2$.

Embodiment 34

The method of any of the precedent embodiments, wherein the mixture is a shear thinning slurry.

Embodiment 35

The method of embodiment 34, wherein the shear thinning slurry is characterized that a decrease in viscosity of the mixture from a shear rate of 0.1 s$^{-1}$ to a shear rate of 500 s$^{-1}$ is at least 10 cP, such as at least 30 cP, at least 50 cP, or at least 80 cP.

Embodiment 36

The method of embodiment 34, wherein shear thinning slurry is characterized that a decrease in viscosity of the mixture from a shear rate of 0.1 s$^{-1}$ to a shear rate of 500 s$^{-1}$ is not greater than 1500 cP, such as not greater than 1200 cP, not greater than 1000 cP, or not greater than 800 cP.

Embodiment 37

The method of any of the precedent embodiments, wherein the mixture comprises alumina particles having an average particle size from 100 nm to 5000 nm in an amount of 15 vol % to 50 vol %.

Embodiment 38

The method of embodiment 37, wherein the alumina particles have an average particle size from 300 nm to 3000 nm and are present in an amount of 18 vol % to 40 vol %, and wherein the mixture is a shear thinning slurry having a viscosity of not greater than 900 cP at a shear rate of 1 s$^{-1}$, and at viscosity of at least 70 cP at a shear rate of 500 s-1.

Embodiment 39

The method of embodiments 37 or 38, wherein the mixture has a viscosity not greater than 150 cP at a shear rate of 500 s$^{-1}$.

Embodiment 40

The method of any of embodiments 37 to 39, wherein the mixture comprises at least 30 vol % alumina and the forming of the three dimensional body is conducted at an applied UV power of at least 3 mW/cm$^2$ and not greater than 12 mW/cm$^2$.

Embodiment 41

The method of any of embodiment 37 to 39, wherein the alumina particles are present in an amount of 16 vol % to 25 vol %, and the forming of the three dimensional body is conducted at an applied UV power of at least 1.0 mW/cm$^2$ and not greater than 12 mW/cm$^2$.

Embodiment 42

The method of any of embodiments 1 to 36, wherein the mixture comprises silica particles having an average particle size from 100 nm to 5000 nm and in an amount of 15 to 40 vol %.

Embodiment 43

The method of embodiment 42, wherein the silica particles have an average particle size from 1000 nm to 3000 nm and are present in an amount of 25 vol % to 35 vol %, and wherein the mixture is a shear thinning mixture having a viscosity of not greater than 200 cP at a shear rate of 1 $s^{-1}$ and a viscosity of at least 50 cP at a shear rate of 500 $s^{-1}$.

Embodiment 44

The method of embodiments 42 or 43, wherein the mixture has a viscosity not greater than 100 cP at a shear rate of 500 $s^{-1}$.

Embodiment 45

The method of any of embodiments 42 to 44, wherein the mixture comprises at least 25 vol % silica and the forming of the three dimensional body is conducted at an applied UV power of at least 1.0 mW/cm² and not greater than 12 mW/cm².

Embodiment 46

The method of any of the precedent embodiments, further comprising subjecting the three dimensional body to high temperature sintering at a temperature of at least 1000° C.

Embodiment 47

The method of embodiment 46, wherein high temperature sintering forms a ceramic body, the ceramic body having a density of at least 90% of its theoretical density.

Embodiment 48

The method of embodiment 47, wherein the ceramic body consists essentially of alumina.

Embodiment 49

The method of embodiment 47, wherein the ceramic body consists essentially of silica.

Embodiment 50

The method of any of the precedent embodiments, wherein forming is conducted at a forming speed of at least 25 mm/hr.

Embodiment 51

The method of any of the precedent embodiments, wherein forming is conducted at a forming speed of at least 60 mm/hr.

Embodiment 52

A method of forming a body comprising: forming a three-dimensional body using an additive manufacturing process, the three-dimensional body having a content of ceramic solid particles of at least 15 vol % for a total volume of the body, wherein the three-dimensional body has a total volume of at least 0.1 mm³, and wherein forming is completed at a forming speed of at least 25 mm/hr.

Embodiment 53

The method of embodiment 52, wherein the forming speed is at least 60 mm/hr.

Examples

The following non-limiting examples illustrate the present invention.

Example 1

Example 1 demonstrates the change in cure depth of UV-radiation curable mixtures with different types of ceramic particles. The ceramic particle powders used in the experiments were alumina, zirconia, silica, magnesium-magnesia aluminate (MMA), silicon nitride, silicon carbide, and graphite.

Ceramic slurries were prepared for each type of ceramic powder using as radiation curable material for all samples 1,6 hexanediol diacrylate (Sartomer SR238, hereinafter used as "monomer") and a photoinitiator (Irgacure 819). A summary of the ceramic powder slurries used in the experiments can be seen in Table 1.

TABLE 1

| | Type of solid particles | Aver. particle size | Spec. surface area | Amount of solid particles [vol %] | Amount of solid particles [wt. %] | Amount of monomer [wt. %] | Amount of photoinitiator [wt. %] | Amount of dispersant [wt. %] |
|---|---|---|---|---|---|---|---|---|
| E1 | — | | | — | | | | |
| E2 | Al$_2$O$_3$ | 500 nm | 7 | 35 | 67.52 | 29.35 | 0.59 | 2.55 |
| E3 | ZrO$_2$ | 300 nm | 7 | 27.6 | 69.09 | 27.14 | 0.54 | 3.23 |
| E4 | SiO$_2$ | 1.7 μm | 2 | 30 | 51.49 | 45.79 | 0.91 | 1.81 |
| E5 | MMA | 3 μm | 1 | 28 | 57.89 | 38.11 | 0.76 | 3.23 |
| E6 | Si$_3$N$_4$ | 1.5 μm | 9 | 27.4 | 55.88 | 37.99 | 0.76 | 5.37 |
| E7 | SiC | 2 μm | 0.47 | 30 | 56.91 | 41.78 | 0.83 | 0.47 |

All mixtures E2 to E7 contained a dispersant which insured that the ceramic particles did not settle over a time period of at least 1 hour. Table 2 gives a summary of the settling tests performed to select the appropriate dispersant. Three dispersants (Disperbyk-111, Disperbyk-180, Disperbyk-168) were selected on the basis of their potential chemical affinity to the radiation curable monomer. Mixtures of monomer, specific dispersant and powder were prepared and mixed using a resodyn acoustic mixer and were observed thereafter for settling behavior over the period of four days. The efficiency of each dispersant was assessed by visual inspection. Disperbyk-111 was observed to be the most effective dispersant for the alumina slurries, whereas Dysperbyk-168 was the best dispersant for all the other mixtures.

TABLE 2

Type of Dispersant

|  | Disperbyk-111 Copolymer with acidic groups | Disperbyk-180 Alkylol ammonium salt of a copolymer with acidic groups | Disperbyk-168 Solution of a high molecular weight block copolymer with pigment affine groups |
|---|---|---|---|
| Alumina (Al$_2$O$_3$) | effective | partially effective | partially effective |
| Zirconia (ZrO$_2$) | partially effective | effective | effective |
| Silicon Carbide (SiC) | not performed | fully settled | effective |
| Silicon nitride (Si$_3$N$_4$) | not performed | not effective | partially effective |
| MMA (Magnesia-Magnesium Aluminate) | partially effective | partially effective | effective |

For the measurement of the cure depth, a chamber was filled with the mixture to be tested (E1 to E7), and the mixture was exposed to a static image made of a series of light dots, wherein the dots differed in their light intensity. The image was projected from a Digital Light Projector connected to a UV lamp (405 nm). The light intensity of each dot was controlled by scaling down the [R G B] intensity of the dots directly on the image. For most curing experiments, the power of the lamp was 30 mW/cm², and the resin was exposed to the radiation for 60 seconds at a maximum UV exposure of 1800 mJ/cm² for the dot with the highest light intensity. The thickness of each printed dot was then measured with a micro-caliper to obtain a relationship of cure depth in dependency to the UV exposure.

Figure 3:
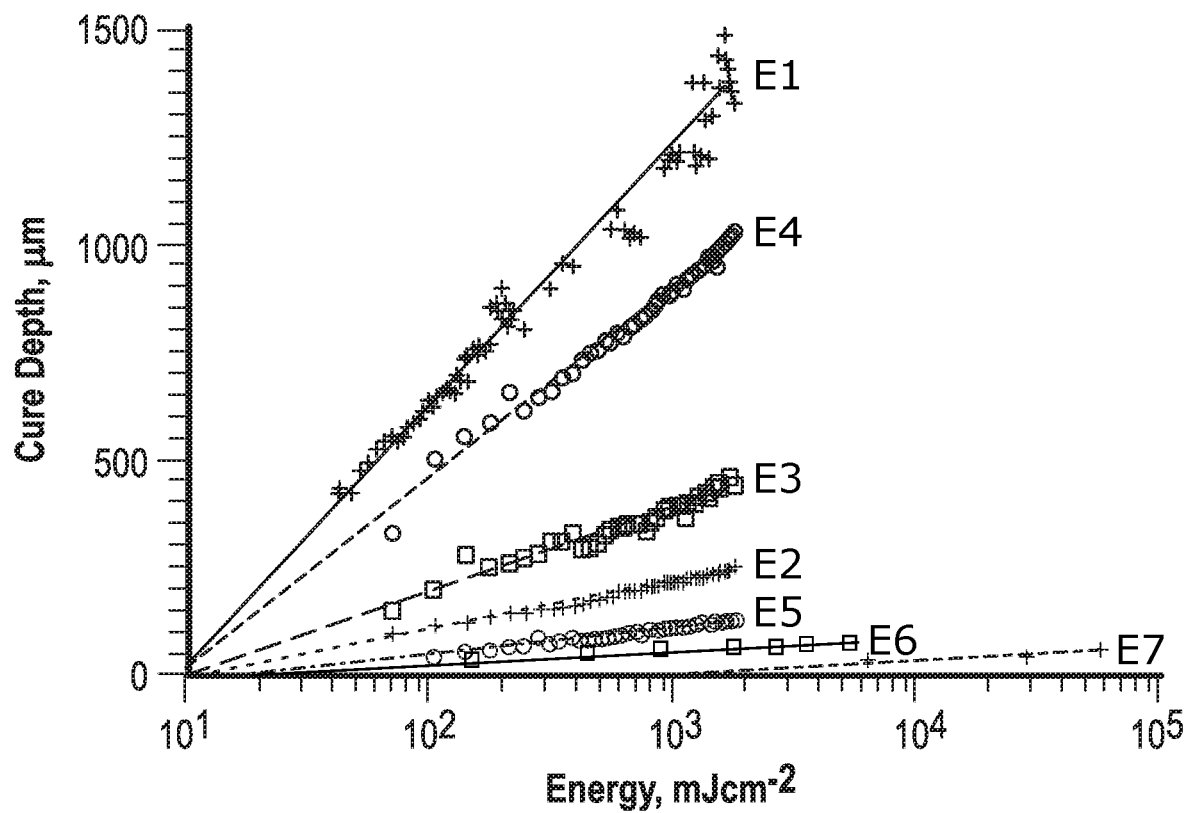
FIG. 3 is a graph showing the cure depth with increasing UV exposure of mixtures containing each a different type of ceramic particles and of a mixture without ceramic particles.

As can be seen in Table 3 and FIG. 3, the presence of ceramic particles (samples E2 to E7) resulted in a much lower cure depth in comparison to the cure depth of the mixture containing no ceramic particles (E1). It can be further seen that there are large differences between the tested mixtures. The highest cure depth was observed for the silica comprising slurries, followed by slurries containing MMA, alumina, zirconia and silicon carbide.

TABLE 3

Cure depth with varying UV exposure for different mixtures

| UV Exposure [mJ/cm2] | Cure depth [µm] | | | | | | |
|---|---|---|---|---|---|---|---|
|  | E1 | E2 | E3 | E4 | E5 | E6 | E7 |
| 247 | 800 | 140 | 66 | 608 | 269 | — | — |
| 388 | 940 | 160 | 86 | 695 | 327 | 40 | — |
| 529 | 900 | 180 | 86 | 770 | 322 | — | — |
| 671 | 1010 | 190 | 94 | 803 | 349 | — | — |
| 812 | 980 | 200 | 98 | 847 | 354 | — | — |
| 953 | 1190 | 210 | 105 | 878 | 376 | 50 | — |
| 1094 | 1210 | 210 | 111 | 898 | 389 | — | — |
| 1235 | 1210 | 220 | 111 | 927 | 398 | — | — |
| 1376 | 1280 | 230 | 116 | 958 | 414 | — | — |
| 1518 | 1430 | 230 | 118 | 949 | 436 | — | — |
| 1659 | 1420 | 240 | 120 | 1000 | 443 | — | — |
| 1800 | 1320 | 250 | 125 | 1022 | 439 | 59 | — |
| 2700 | — | — | — | — | — | 60 | <1 |
| 3600 | — | — | — | — | — | 66 | — |
| 5400 | — | — | — | — | — | 70 | 1 |

It can be further seen from FIG. 3 that the increase in cure depth is linear to the logarithms of the applied radiation energy for all mixtures. The slope of the straight lines for each mixture can be correlated to the curing sensitivity $D_p$ of the mixtures with regard to UV exposure.

Table 4 shows the curing sensitivity $D_p$ values obtained from the slopes of FIG. 3 with regard to the refractive index of the ceramic materials of the mixtures. Not to be bound by theory, the sensitivity values $D_p$ indicate that the curing sensitivity of the mixtures decreases with increasing scattering of the particles and strongly relates to the refractive index of the ceramic particles.

TABLE 4

| Example | Ceramic Particles | Sensitivity $D_p$ [µm] | Refractive Index | Particle Size | Particle Amount [vol %] | SSA |
|---|---|---|---|---|---|---|
| E1 | — | 249 | 1.5* | | | |
| E4 | Silica | 192 | 1.5‡ | 1700 nm | 30 | 2 |
| E3 | MMA | 85 | 1.7‡ | 3000 nm | 28 | <1 |
| E2 | Alumina | 49 | 1.8‡ | 500 nm | 35 | 7 |
| E5 | Zirconia | 29 | 2.2‡ | 300 nm | 27.6 | 7 |

*Monomer
‡Ceramic particles

Example 2

Radiation curable mixtures with and without Al$_2$O$_3$ (E4 and E1), have been further compared by measuring the thickness of the inhibition zone for each sample with increasing UV exposure.

Figure 4:
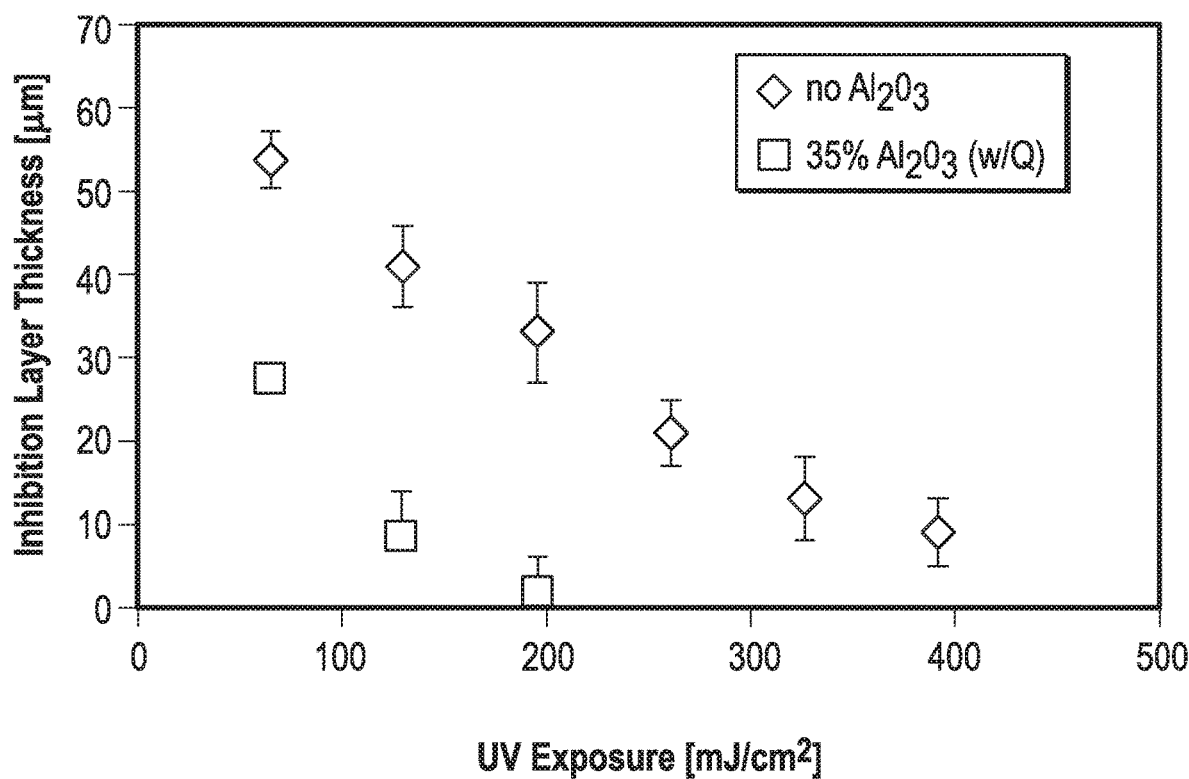
FIG. 4 is a graph showing the thickness of the inhibition zone in dependence to the UV exposure of a mixture containing ceramic particles according to one embodiment and of a mixture without ceramic particles.
Figure 5:
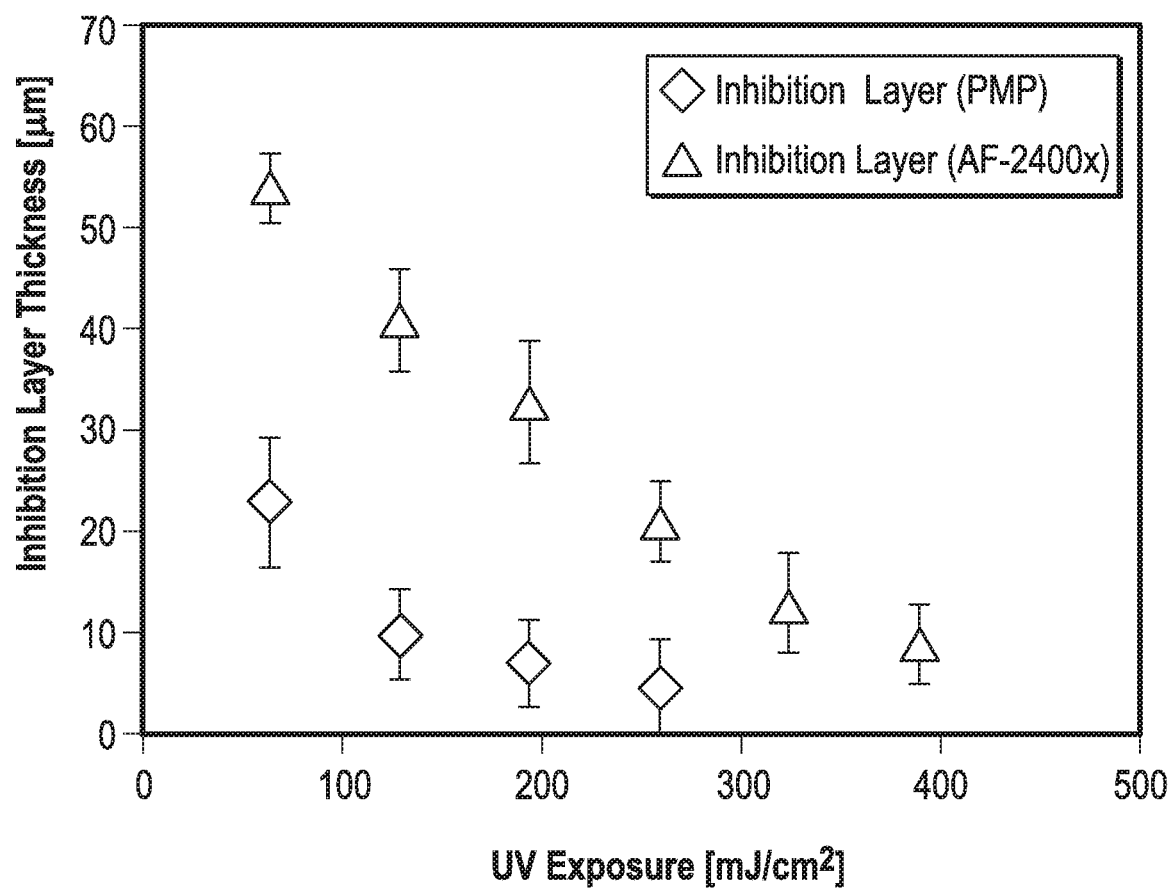
FIG. 5 is a graph comparing two types of oxygen permeable membranes with regard to the thickness of an inhibition zone formed during varying UV exposure according to embodiments.

As can be seen in Table 5 and FIG. 4, the presence of 35 vol % Al$_2$O$_3$ lowered the thickness of the inhibition zone to a large extent in comparison to the thickness of the inhibition zone of the mixture not containing Al$_2$O$_3$.

TABLE 5

| UV-Exposure [mJ/cm2] | Inhibition Zone and STD [µm] no alumina | Inhibition Zone and STD [µm] 35 vol % Al2O3 |
|---|---|---|
| 65 | 54 (3.5) | 26 (2) |
| 130 | 41 (5) | 11 (3) |
| 195 | 33 (6) | 2 (4) |
| 260 | 21 (4) | — |
| 325 | 13 (5) | — |
| 390 | 9 (4) | — |

It could further be observed that the amount of ceramic particles and the applied UV exposure needed to be carefully balanced in order to create an inhibition zone which can prevent adsorption of cured mixture on the bottom surface of the chamber. At a UV-exposure at 260 mJ/cm² or higher, the alumina containing slurries did not establish a functioning inhibition zone, and the radiation cured mixture was sticking to the bottom surface of the micro-chamber.

Example 3

Two different types of oxygen permeable membranes—AF-2400X and PMP—were compared regarding their influence on the thickness of a formed inhibition zone under otherwise equal conditions. AF-2400X is an oxygen permeable Teflon membrane made by Biogeneral, and PMP is a polymethylpentene based membrane, also called TPX, made by MITSUI Chemicals. Both membranes had a thickness of 2.2 mils.

For the experiments, the radiation curable material of Example 1 (CLEAR from Formlabs) was used without the inclusion of $Al_2O_3$. As can be seen in Table 6, in the presence of the AF-2400X membrane, the formed inhibition zone is much larger than the inhibition zone created when using a PMP membrane. This indicates that AF-2400X allows the penetration of higher amounts of oxygen in comparison to PMP membrane.

TABLE 6

| UV-Exposure [mJ/cm2] | Thickness of Inhibition Zone and STD [μm] PMP | Thickness of Inhibition Zone and STD [μm] AF-2400X |
|---|---|---|
| 64.9 | 24 (7) | 54 (3.5) |
| 129.8 | 22 (4.5) | 41 (5) |
| 194.8 | 10 (4.5) | 33 (6) |
| 259.7 | 7 (5) | 21 (4) |

Example 4

Continuous forming of a three-dimensional body comprising $Al_2O_3$

A mixture was prepared containing 20 vol % $Al_2O_3$ (Almatis A16) (equals 48.1 wt % $Al_2O_3$), 27.8 wt % radiation curable monomer (Sartomer SR 238), 20.6 wt % radiation curable oligomer (Formlab resin clear), 0.22 wt % of a photo initiator (Irgacure 819), and 3.2 wt % dispersant (Disperbyk-111).

The mixture was placed in a chamber of an assembly having a similar design as shown in FIGS. 1A and 1B. The transparent window of the chamber was made of oxygen permeable Teflon (AF-2400X) with a thickness of 2.2 mils. As electromagnetic radiation unit was used a lensed UV LED device including an array of 12 UV LEDs, each LED having a maximum optical power of 5.6 Watt and a UV wavelength maximum at 405 nm, and positioned below the transparent window of the chamber. On the outer surface of the transparent window was placed a mask having a round opening with a 3 mm inner diameter.

A carrier plate attached to a vertically movable construction was placed into the mixture of the chamber at a distance of about 10 μm above the surface of the transparent window. The mixture was radiated with the UV LEDs, and with a minor time delay of about 1 to 2 seconds, the carrier plate was started to continuously move upwards, pulling a rod-shaped body out of the mixture. The experiment was repeatedly conducted at different continuous forming speeds, such as 30 mm/hour, 60 mm/hour, and 90 mm/hour, as well as at different UV exposures (see Table 7).

TABLE 7

| Forming Speed [mm/hour] | UV Power [mW/cm²] |
|---|---|
| 30 | 1.12 |
| 60 | 1.12 |
| 90 | 0.56 |

Figure 6:
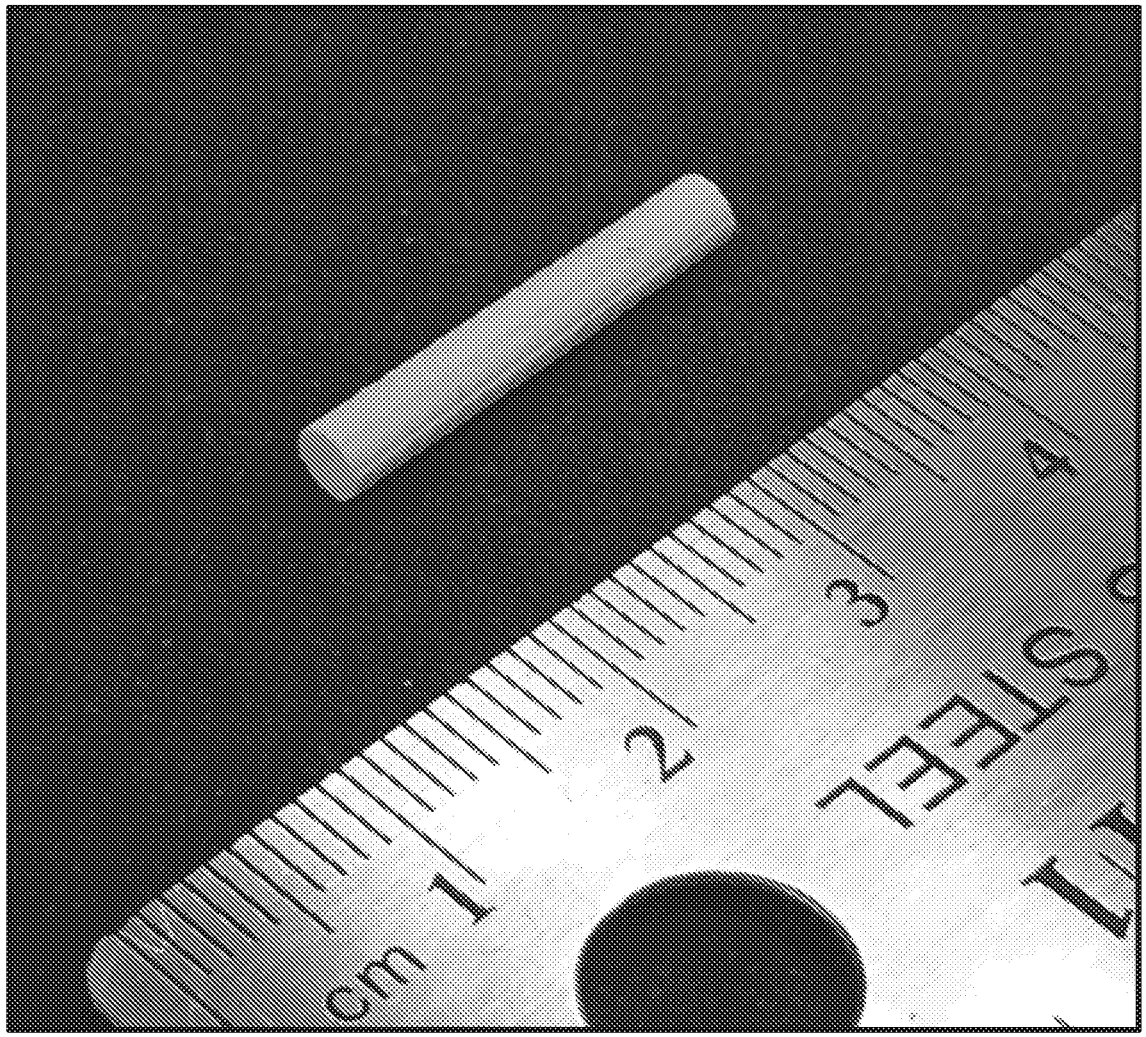
FIG. 6 is an image of a continuously formed three-dimensional green body comprising alumina particles according to one embodiment.
Figure 7:
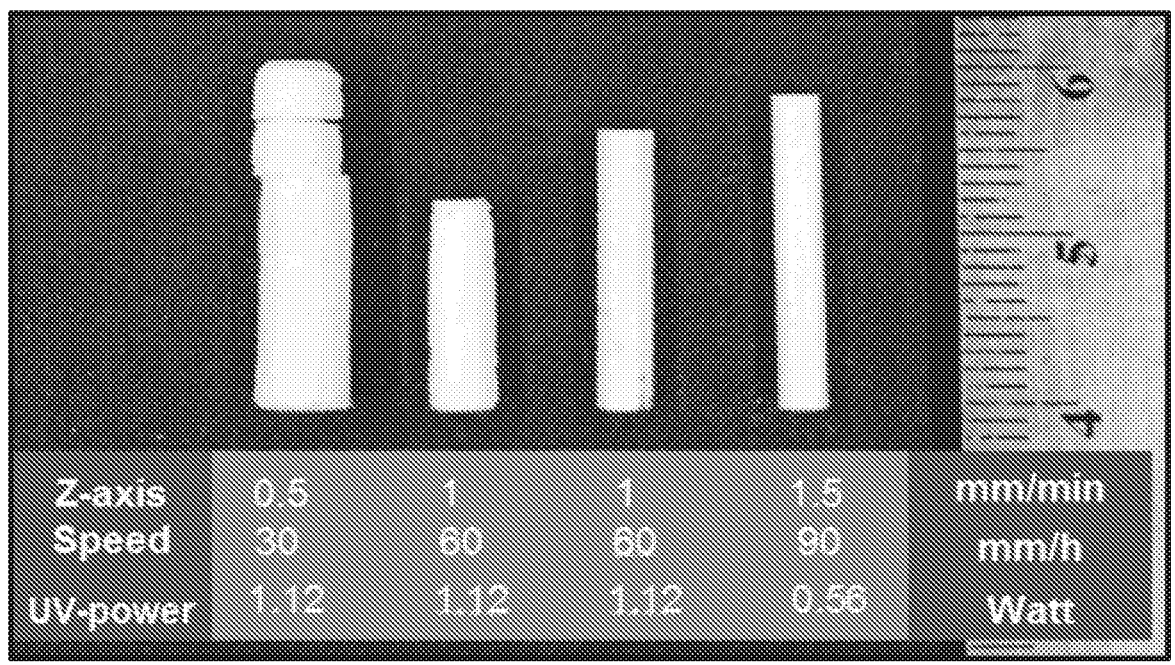
FIG. 7 is an image comparing continuously formed three-dimensional green bodies comprising alumina particles according to embodiments.

A picture of the rod-shaped body formed at a speed of 1.5 mm/min and a UV power of 0.56 mW/cm² is shown in FIG. 6. A comparison of the formed three-dimensional bodies at different UV exposure and different forming speeds can be seen in FIG. 7. The best quality could be obtained at the highest forming speed of 90 mm/hour and the lower UV power of 0.56 mW/cm².

Example 5

A mixture was prepared with the same components as in Example 4, but by increasing the amount of $Al_2O_3$ to 35 vol % (corresponding to 66.1 wt %). The exact formulation was as follows: 66.61 wt % $Al_2O_3$ (A16 Almatis), 17.52 wt % radiation curable monomer (Sartomer SR 238), 13.07 wt % radiation curable oligomer (Formlab resin clear), 0.29 wt % of a photo initiator (Irgacure 819), and 2.52 wt % dispersant (Disperbyk-111). The mixture was not printable because of a too high viscosity. One reason for the high viscosity was the high initial viscosity of the radiation curable oligomer (Formlab resin clear). Based thereon, for the further experiments with mixtures of high solid content (above 25 vol %), no oligomer component was included into the compositions.

Example 6

Continuous forming of three-dimensional body comprising $Al_2O_3$ at different light intensities.

A mixture containing 35 vol % $Al_2O_3$ (Almatis A16) was prepared according to the composition as shown in Table 1, mixture E2.

Figure 8A:
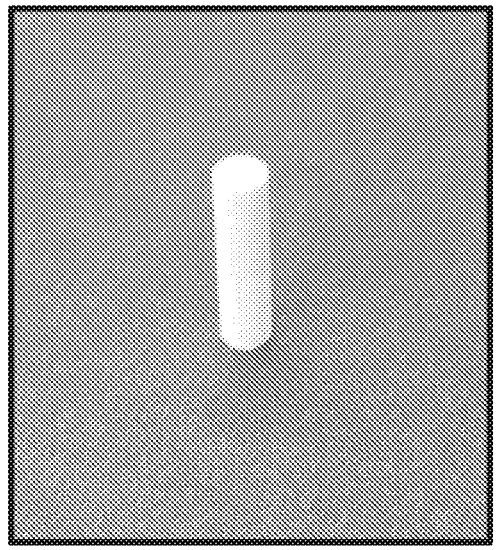
FIG. 8A is an image of a continuously formed green body comprising alumina particles according to one embodiment.
Figure 8B:
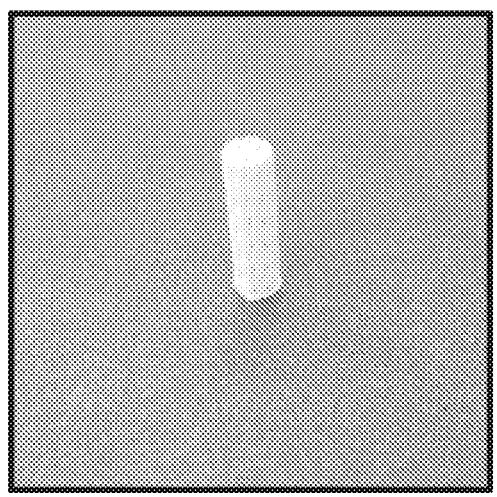
FIG. 8B is an image of a continuously formed green body comprising alumina particles as a comparative example.

A three dimensional body was formed according to the same method and system as described in Example 4. The body was formed at a speed of 60 mm/hour, but at two different applied UV intensities: 1.76 mW/cm² and 7.06 mW/cm². As can be seen in FIG. 8A, at a UV power of 7.06 mW/cm², a dense cylinder could be formed with a desired smooth outer surface. In contrast, at the lower applied UV power, the quality of the formed cylinder was not satisfying, showing hollowed out portions and portions which were not fully cured (FIG. 8B).

Example 7

Continuous forming of three-dimensional body comprising silica at different light intensities.

A mixture containing 30 vol % silica was prepared according to the composition shown in Table 1, mixture E4.

Figure 9:
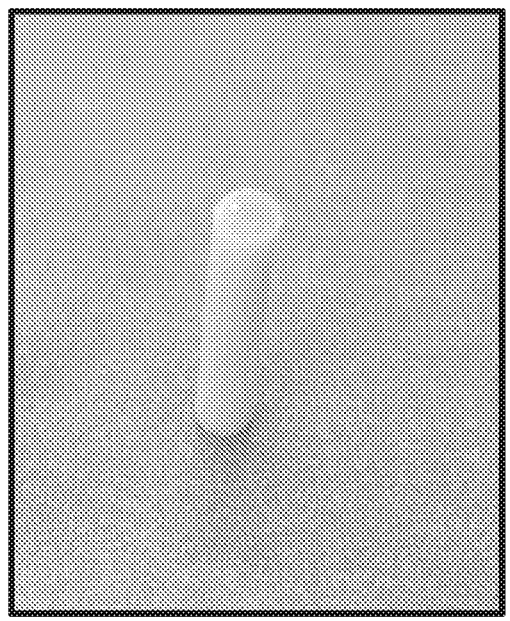
FIG. 9 is an image of a continuously formed green body comprising silica particles according to one embodiment.

A three dimensional body was formed according to the same method and system as described in Example 4. The body was formed at a speed of 60 mm/hour, and at two different applied UV intensities: 1.76 mW/cm² and 7.06 mW/cm². Cylinders of high quality at both UV powers could be formed (see FIG. 9). The forming results correspond well with the previously measured high sensitivity $D_p$ of the silica comprising mixture (see E4 of Example 1).

Example 8

Continuous forming of three-dimensional body comprising MMA at different light intensities A mixture containing 28 vol % MMA was prepared according to the composition shown in Table 1, mixture E5.

Figure 10A:
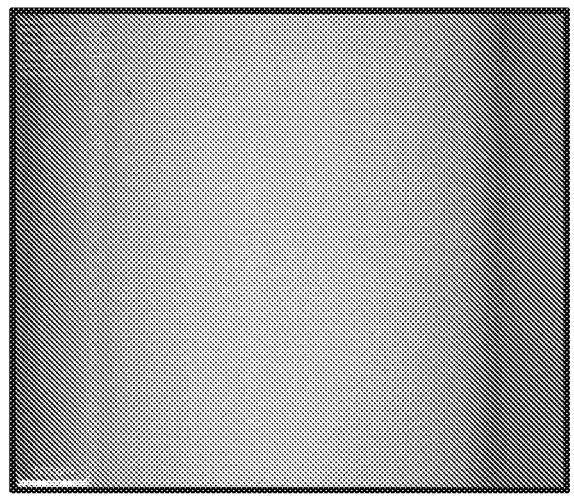
FIG. 10A is an image of a magnified surface structure of a continuously formed green body comprising MMA particles according to one embodiment.
Figure 10B:
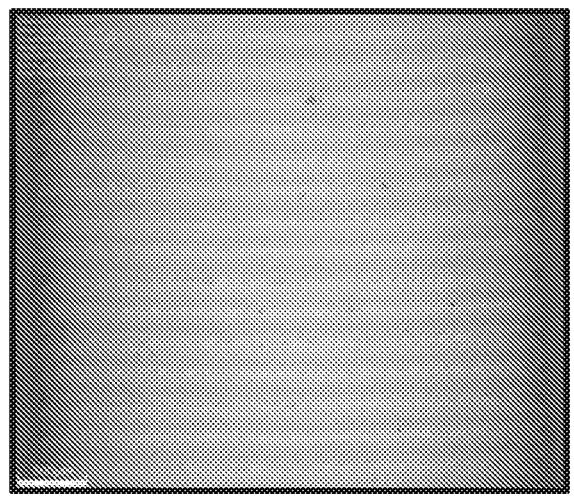
FIG. 10B is an image of a magnified surface structure of a continuously formed green body comprising MMA particles as a comparative example.

A three dimensional body was formed according to the same method and system as described in Example 4. The body was formed at a speed of 60 mm/hour, and at two different applied UV intensities: 3.53 mW/cm² and 7.06 mW/cm². As can be seen in FIG. 10A, a high quality cylinder could be formed at UV power of 3.53 mW/cm². However, at a power of 7.06 mW/cm², the formed cylinder contained undesired ridges, see FIG. 10B. These ridges are attributed to a periodic sticking of the formed body to the oxygen permeable membrane caused by an excess of curing energy, which hinders the forming of a functioning inhibition zone (see Example 2).

Example 9

Continuous forming of three-dimensional body comprising zirconia with varying light intensity A mixture containing 27.6 vol % zirconia was prepared according to the composition shown in Table 1, mixture E3.

Figure 11:
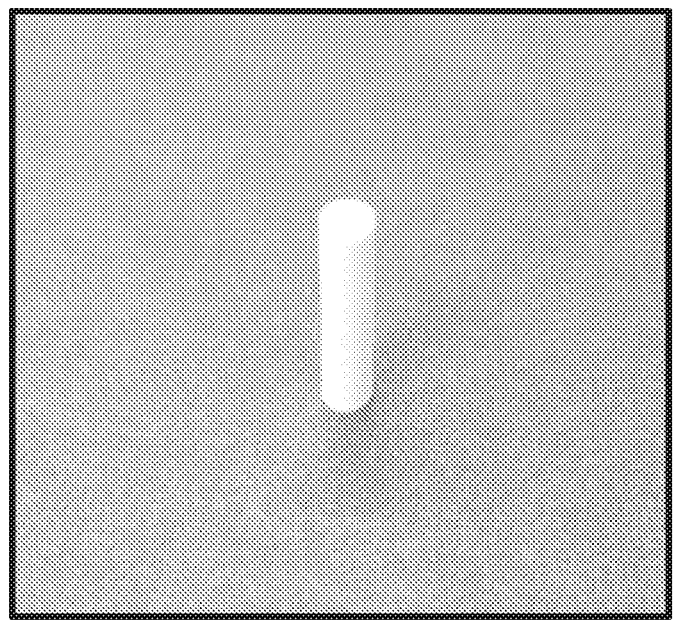
FIG. 11 is an image of a continuously formed three-dimensional green body comprising zirconia particles according to one embodiment.

A three dimensional body was formed according to the same method and system as described in Example 4. The body was formed at a speed of 60 mm/hour, and at two different applied UV intensities: 7.06 mW/cm2 and 11.76 mW/cm². As can be seen in FIG. 11, a high quality cylinder could be formed at a UV power of 7.06 mW/cm². At a power of 11.76 mW/cm², however, a proper forming of a body was not possible because the body was sticking to the bottom of the chamber. The applied UV power was too high in order to create a functioning inhibition zone.

Table 8: Summary of Examples 4 to 9: Continuous forming of three-dimensional bodies at a forming speed of 60 mm/hour with different types of ceramic particles and different light intensities

TABLE 8

| Example | Applied UV power [mW/cm²] | Type of Ceramic | Amount [vol %] | Quality of formed body |
|---|---|---|---|---|
| 4 | 1.12 | Alumina | 20 | high quality |
| 6 | 1.76 | Alumina | 35 | low quality/hollowed portions |
| 7 | 1.76 | Silica | 30 | high quality |
| 8 | 3.53 | MMA | 28 | high quality |
| 6 | 7.06 | Alumina | 35 | high quality |
| 7 | 7.06 | Silica | 30 | high quality |

TABLE 8-continued

| Example | Applied UV power [mW/cm²] | Type of Ceramic | Amount [vol %] | Quality of formed body |
|---|---|---|---|---|
| 8 | 7.06 | MMA | 28 | low quality, undesired ridges |
| 9 | 7.06 | Zirconia | 27.6 | high quality |
| 9 | 11.76 | Zirconia | 27.6 | no forming possible, sticking to bottom of chamber |

Example 10

Continuous forming of three-dimensional bodies comprising silica with different amounts of silica in mixtures.

Three mixtures were prepared with varying amounts of silica in the mixtures: 30 vol % (E8), 40.3 vol % (E9) and 45.2 vol % (E10). The average silica particle size in all three mixtures was 1.7 µm. All mixtures further contained monomer (Sartomer SR238), photoinitiator (Irgacure 819), and dispersant Dysperbyk-168).

Figure 12:
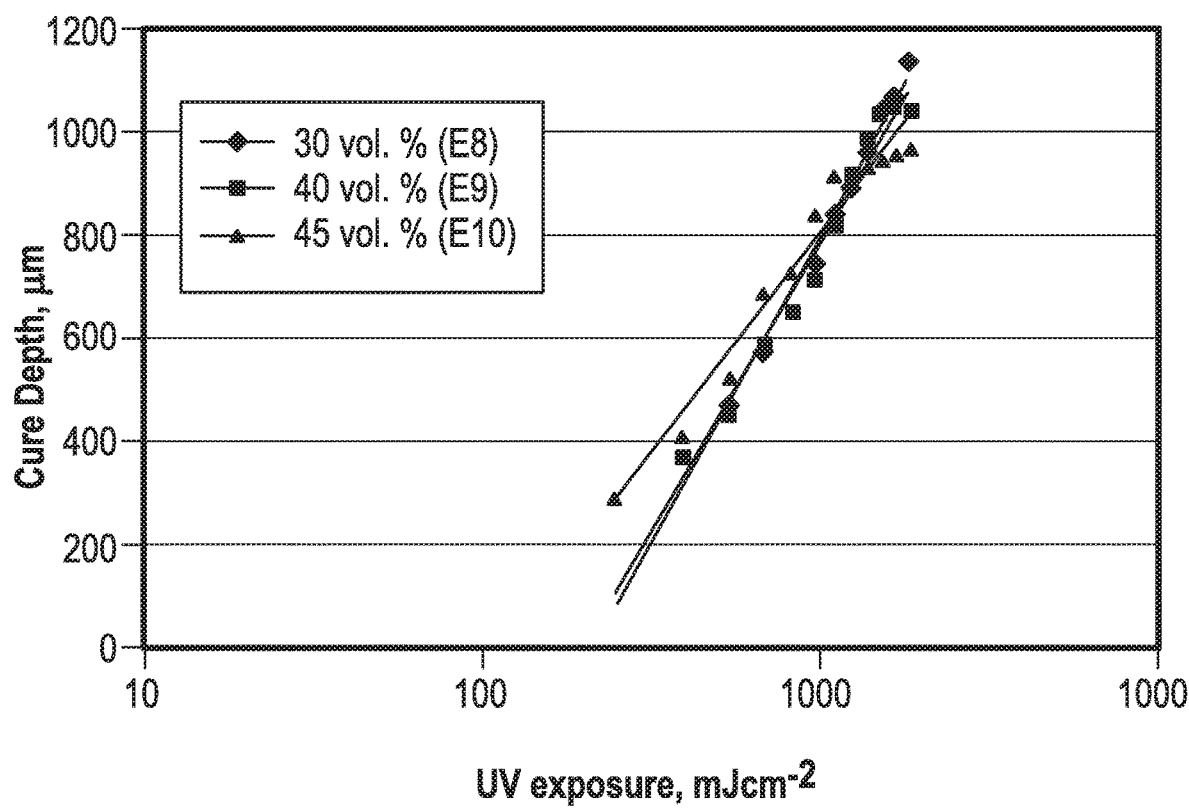
FIG. 12 is a graph comparing cure depth with increasing UV exposure of mixtures with different amounts of silica particles.

Similar as in Example 1, the cure depths of the mixtures E8, E9, and E10 were measured with increasing UV exposure and the curing sensitivity $D_p$ for each mixture were calculated from the slope of the linear curves (see FIG. 12). As can be seen in FIG. 12, the slopes for all tested mixtures are very similar, which indicates that the curing sensitivities $D_p$ of the mixtures varied only minor with the changing amounts of solid loadings, i.e., being 508 µm (for E8), 489 µm (for E9), and 371 µm (for E10).

As another characterization of mixtures E8, E9, and E10, the viscosities with varying shear rate were measured for of each mixture.

All viscosity measurements of the mixtures of the present disclosure under certain shear rates were conducted with a Discovery HR-1 Rotational Rheometer using a cone and plate geometry with a 40 mm diameter and a 2 degree cone angle, wherein the shear rate was constant across the entire sample. The tests were done in flow mode at a temperature of 25° C.

Figure 13:
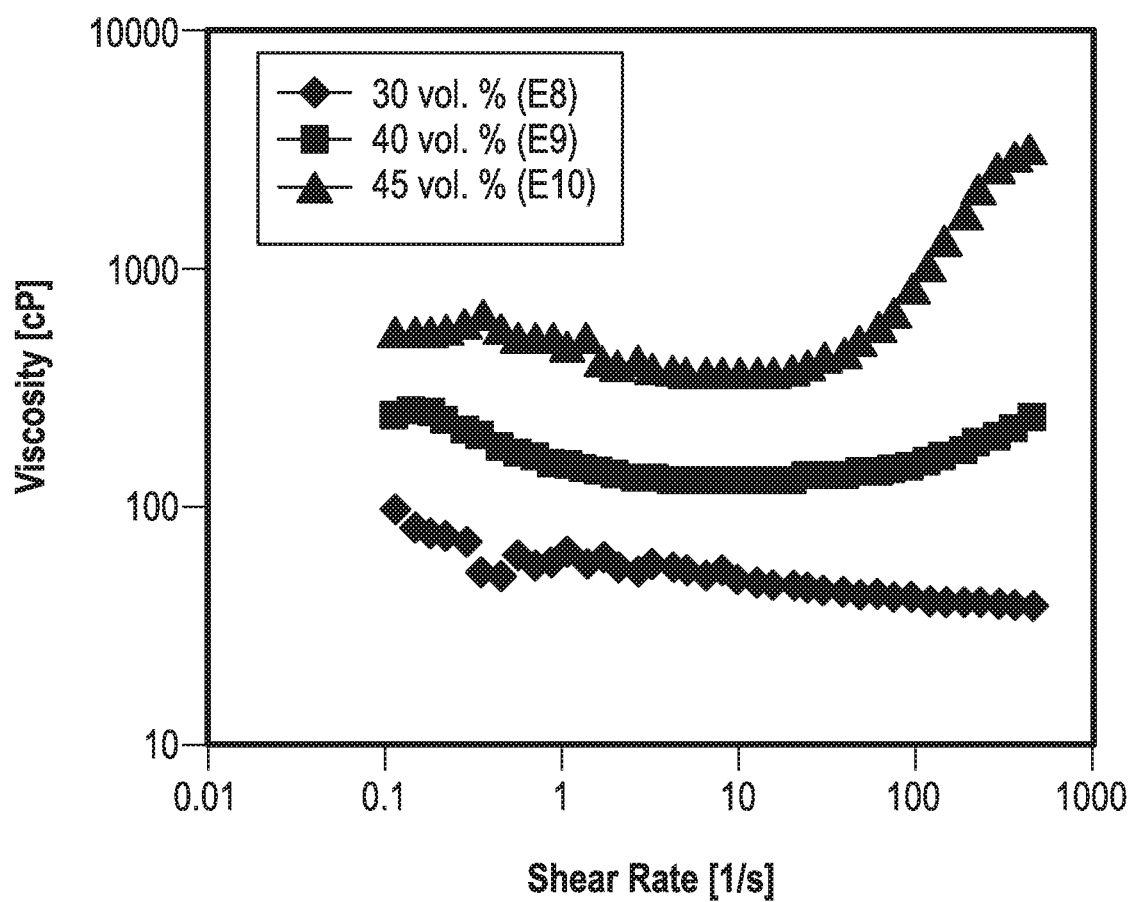
FIG. 13 is a graph comparing viscosity with increasing shear rate of mixtures with different amounts of silica particles.

As can be seen in FIG. 13, mixture E8 showed a shear thinning behavior, while mixtures E9 and E10 showed a shear thickening behavior.

Figure 14:
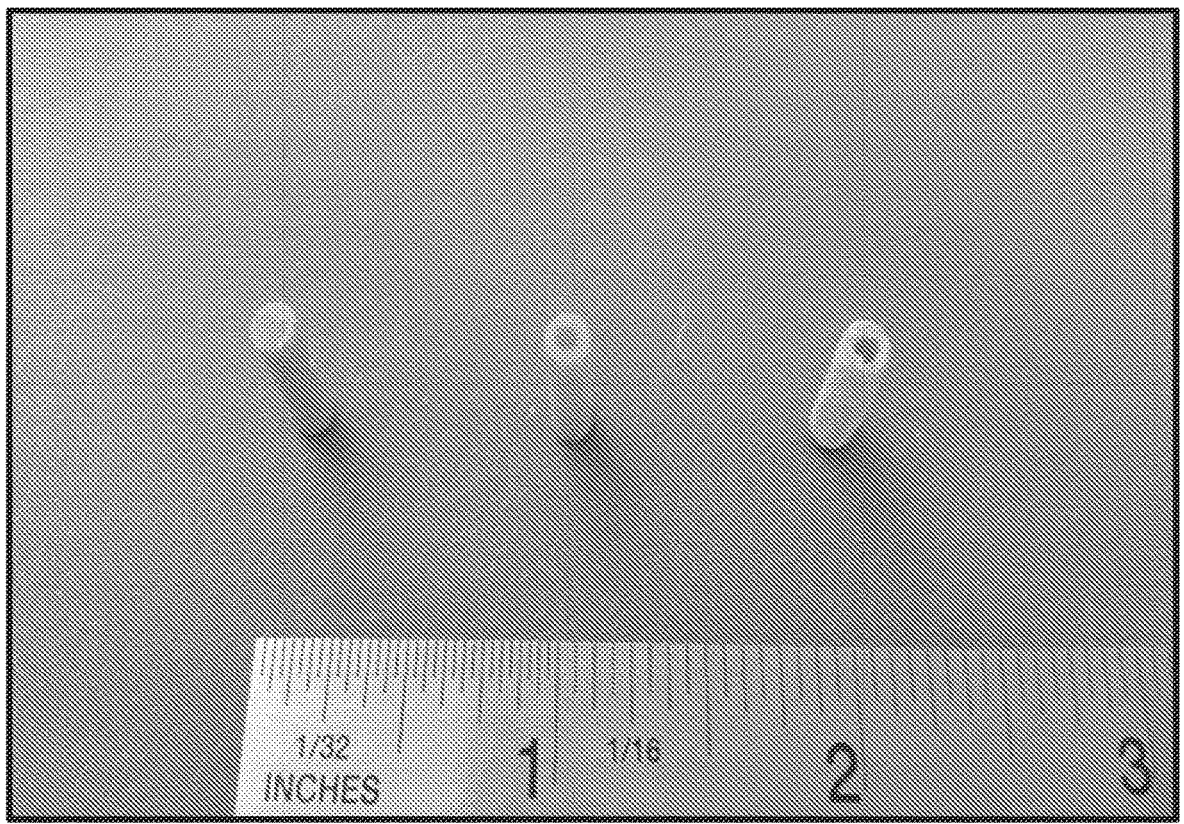
FIG. 14 is an image comparing continuously formed three-dimensional green bodies from mixtures with different silica content.

Three dimensional bodies were formed from mixtures E8, E9, and E10 according to the same method and system as described in Example 4. The bodies were formed at a speed of 60 mm/hour, and at a UV intensity of 7.06 mW/cm2. As can be seen in FIG. 14, a high quality cylinder was formed from mixture E8, however, cylinders with inferior quality were formed with mixtures E9 and E10, which included hollow parts. A summary of the experiments is shown in Table 9.

Not to be bound to theory, the quality differences between the formed bodies of mixtures E8, E9, and E10 indicate that advantageous for the forming of a high quality body is a shear thinning behavior of the mixtures.

TABLE 9

| Type of solid particles | Amount of SiO$_2$ [vol %] | Amount of SiO$_2$ [wt. %] | Viscosity [cP] at shear rate 1 s$^{-1}$ | Viscosity [cP] at shear rate 100 s$^{-1}$ | Viscosity behavior | Quality of printed body |
|---|---|---|---|---|---|---|
| E8 SiO$_2$ | 30 | 51.49 | 70 | 40 | shear thinning | high quality |
| E9 SiO$_2$ | 40.3 | 64.15 | 150 | 150 | shear thickening | inferior quality |
| E1 SiO$_2$ | 45.2 | 68.62 | 490 | 900 | shear thickening | inferior quality |

Example 11

Continuous forming of three-dimensional bodies comprising alumina with different average particle size.

Three mixtures were prepared containing alumina particles in an amount of 35 vol % but with varying average particle size, i.e., 500 nm (mixture E11), 2 μm (mixture E12), and 10 μm (mixture E13). All mixtures further contained monomer (Sartomer SR238), photoinitiator (Irgacure 819), and dispersant Dysperbyk-111).

Figure 15:
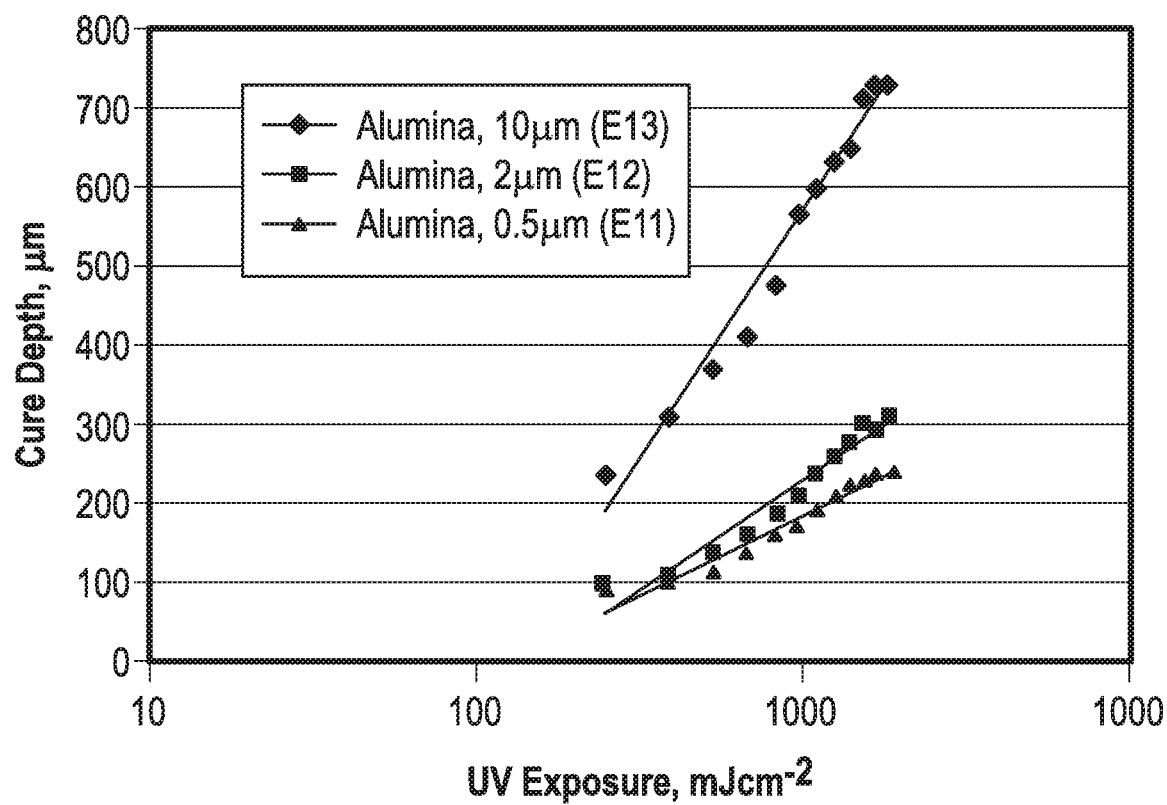
FIG. 15 is a graph comparing cure depth with increasing UV exposure of mixtures with different alumina particle sizes.
Figure 16:
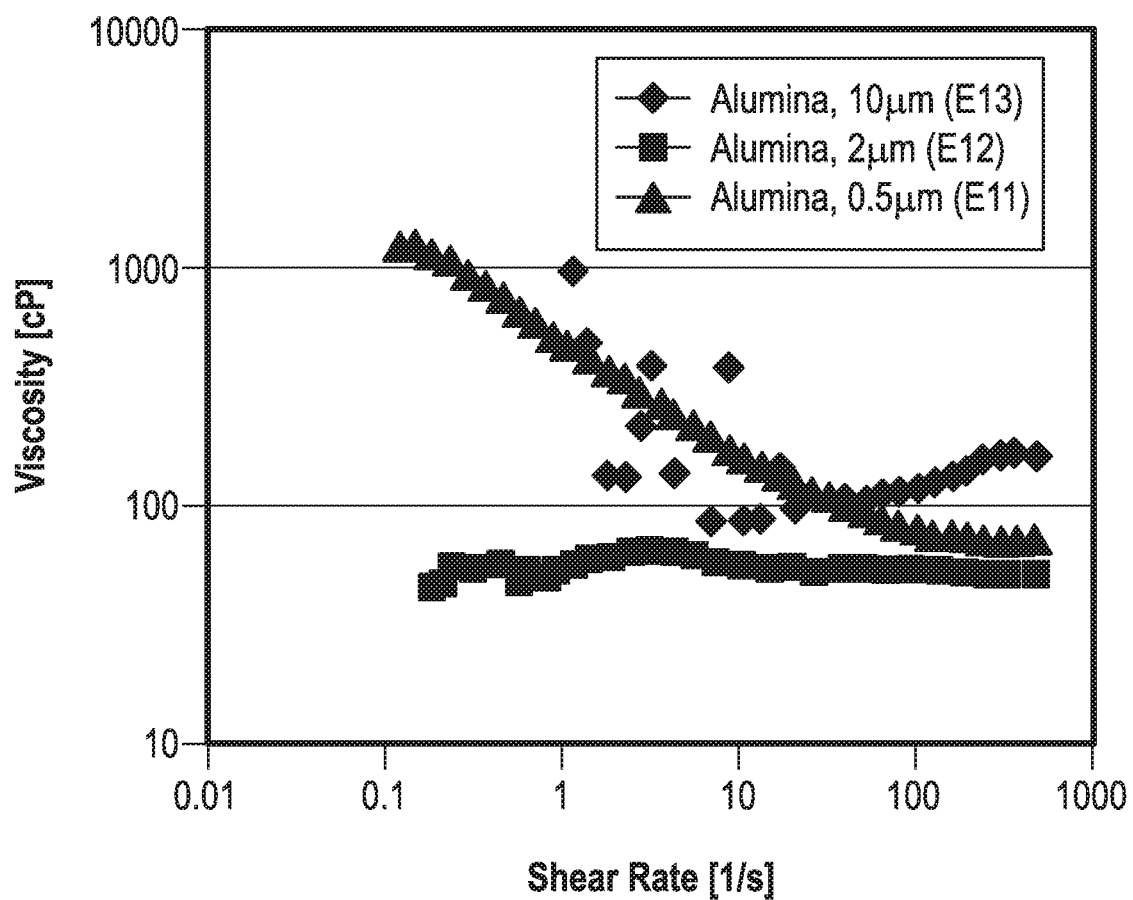
FIG. 16 is a graph comparing viscosity with increasing shear rate of mixtures with different alumina particle sizes.

For evaluating printability of the mixtures, the cure depth in dependency to the UV exposure (405 nm) was measured and the sensitivity D$_p$ calculated from the slopes of the curves, as described in Example 1. As can be seen in FIG. 15 and Table 10, mixture E13 with the largest particle size had the highest curing sensitivity.

Although mixture E13 had the highest sensitivity, its viscosity behavior made it unsuitable for printing a body. The viscosity measurement are shown in FIG. 15: Mixture E11 showed a shear thinning behavior, and slurry E12 showed an almost Newtonian behavior with a very low viscosity. In contrast, slurry E13 had a high viscosity at low shear rates and showed chaotic measurements over a larger viscosity range. Mixture E13 also showed a very rapid settling behavior (within a few minutes).

As a result, continuous printing was not possible for mixture E13. In comparison, both mixtures E11 and E12 were suitable for printing, and cylindrical bodies with good quality were printed at a forming speed of 60 mm/hour and a UV intensity of 7.06 mW/cm$^2$. A summary of the results of Example 11 can be seen in Table 10.

TABLE 10

| Type of solid particles | Aver. particle size | Sensitivity Dp | Viscosity [cP] at shear rate 1 s$^{-1}$ | Viscosity [cP] at shear rate 500 s$^{-1}$ | Viscosity behavior | Quality of printed body |
|---|---|---|---|---|---|---|
| E11 Al$_2$O$_3$ | 500 nm | 87 | 700 | 95 | shear thinning | high quality |
| E12 Al$_2$O$_3$ | 2 μm | 121 | 85 | 90 | Newtonian | high quality |
| E13 Al$_2$O$_3$ | 10 μm | 271 | n.d. | 250 | chaotic behavior at low shear rates; no shear thinning | body cannot be formed |

Example 12

Forming a complex flower shape with alumina comprising slurry followed by de-binding and sintering A three dimensional flower-shaped green body was formed using the same mixture and method as described in Example 2 (alumina comprising mixture, E2) The flower-shaped body was formed at a speed of 60 mm/hour, and an applied UV intensity of 6 mW/cm$^2$ (see FIG. 17).

After the forming of the green body, the following de-binding and sintering regime was applied:

Heating at a rate of 1° C./min up to 325° C.; holding the temperature for 30 minutes at 325° C., heating at rate of 1° C./min up to 650° C.; holding the temperature for 1 hour at 650° C.; heating at a rate of 5° C./min up to 1480° C.; holding the temperature for 30 minutes at 1480° C.; heating at a rate of 1° C./min up to 1550° C.; holding the temperature for 1 hour at 1550° C.; cooling down at a rate of 5° C./min to room temperature.

Figure 17A:
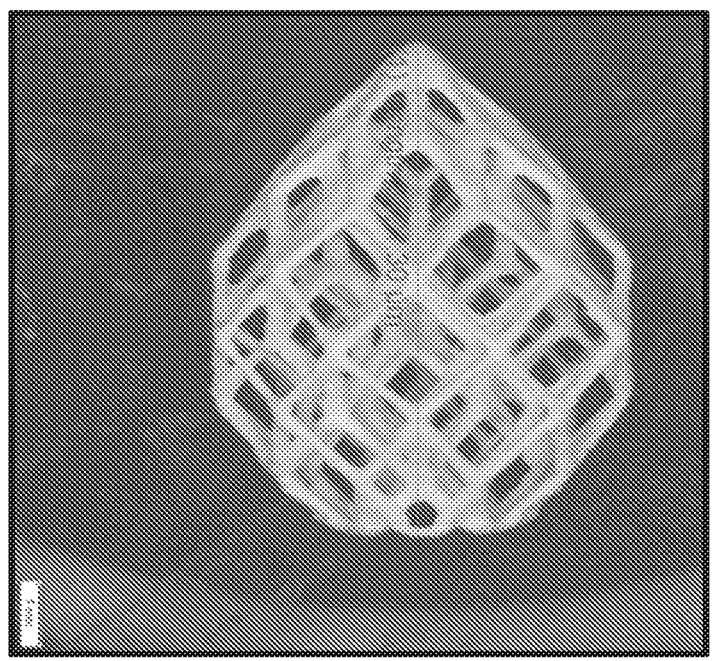
FIG. 17A is an image of a continuously formed flower shaped green body comprising alumina particles according to one embodiment.
Figure 17B:
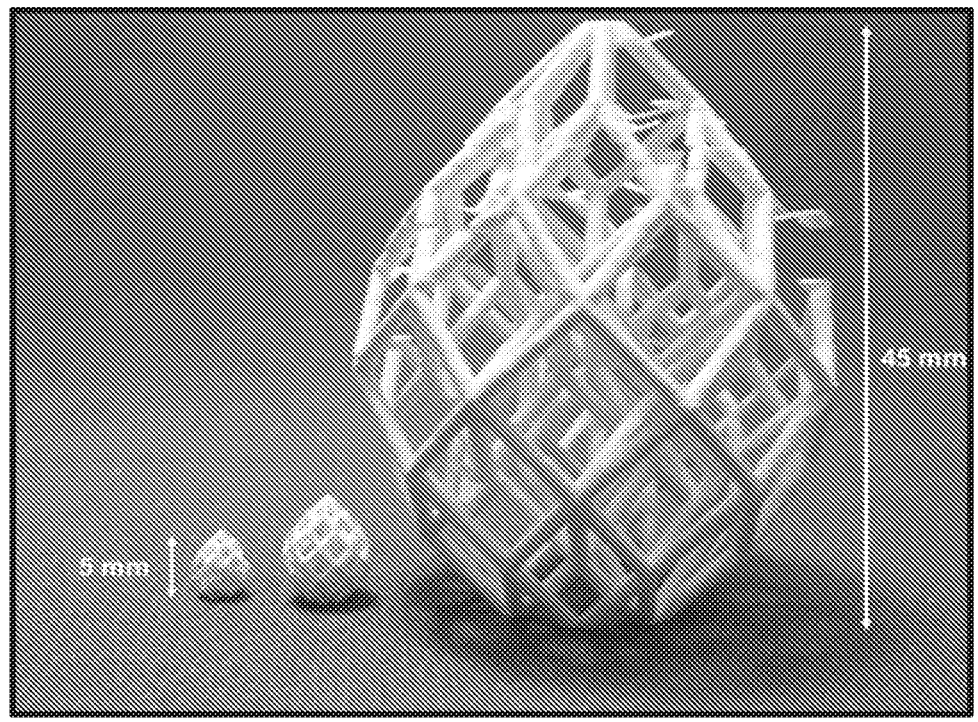
FIG. 17B is an image of a continuously formed flower shaped ceramic body after high temperature sintering according to one embodiment.
Figure 18:
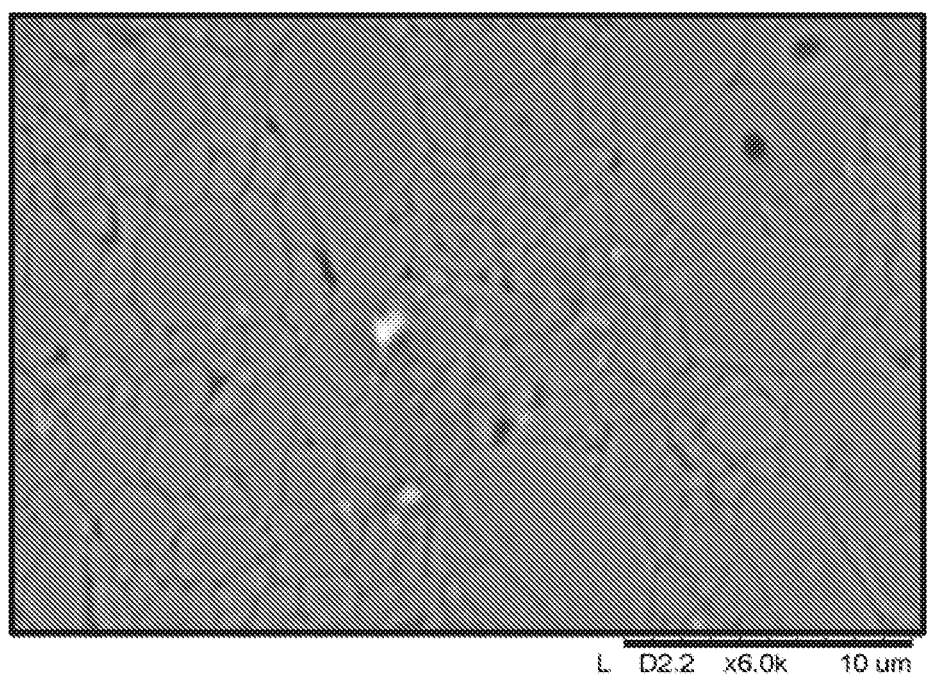
FIG. 18 is an image of a polished cross-section of an individual post of the flower shaped ceramic body of FIG. 17B after high temperature sintering according to one embodiment.

After the high temperature sintering, the flower-shaped body have kept its integrity, despite a shrinkage of about 23%. FIG. 17A shows an example of a flower-shaped green body before high temperature sintering, and FIG. 17B shows flower-shaped ceramic bodies after high temperature sintering The microstructure of the sintered ceramic flower was investigated using Scanning Electron Microscope (SEM) technology. Apart of a few minor surface delaminations, no larger cracks or defects could be observed. Cross-sections of individual posts of the flower were polished and thermally etched at 50° C. below the maximal sintering temperature for 30 minutes. As can be seen in FIG. 18, the cross-section shows a high and uniform density throughout the part with a grain size in the range of 0.5 to 10 microns.

The high density of the sintered ceramic flower was also confirmed by Archimedes and Helium picnometry methods. The average density was 92.7% of the theoretical density of alumina if measured by the Archimedes method, and 93% of the theoretical density was measured with the Helium pycnometry method.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the invention.

What is claimed is:

1. A method of forming a body comprising:
forming a three-dimensional body from a mixture, the mixture comprising at least 15 vol % of solid particles for a total volume of the mixture and a radiation-curable material, wherein forming includes continuous translation and growth of the body from an interface of the mixture,
wherein forming comprises selecting a power range of an applied electromagnetic radiation used for curing the radiation-curable material, wherein the power range of the electromagnetic radiation is based at least in part upon a material of the solid particles, an amount of the solid particles in the mixture, and an average particle size of the solid particles in the mixture;
the applied electromagnetic radiation has a power of at least 0.1 mW/cm$^2$ and not greater than 250 mW/cm$^2$; and
the interface of the mixture is adjacent to an inhibition zone of the mixture.

2. The method of claim 1, wherein the radiation-curable material comprises a photoinitiator and a polymerizable monomer.

3. The method of claim 1, wherein during forming portions of the mixture are subjected to electromagnetic radiation having a wavelength in a range from 200 nm to 760 nm.

4. The method of claim 3, wherein the electromagnetic radiation has a wavelength from at least 370 nm to not greater than 450 nm.

5. The method of claim 3, wherein the electromagnetic radiation has an energy from at least 20 mJ/cm$^2$ to not greater than 450 mJ/cm$^2$.

6. The method of claim 1, wherein the solid particles include ceramic particles, metallic particles, polymeric particles, or any combination thereof.

7. The method of claim 6, wherein the solid particles are selected from the group of alumina, silica, MMA, or zirconia.

8. The method of claim 6, wherein the solid particles include ceramic particles and polymeric particles, and wherein the solid polymeric particles do not dissolve in the mixture.

9. The method of claim 6, wherein the solid particles include polymeric particles, and the solid polymeric particles do not dissolve in the mixture.

10. The method of claim 1, wherein the mixture is a shear thinning slurry.

11. The method of claim 1, wherein forming of the three-dimensional body is conducted in a vertical direction away from the inhibition zone at a speed of at least 25 mm/hr.

12. The method of claim 11, wherein forming of the three-dimensional body is conducted at a speed of at least 60 mm/hr.

13. The method of claim 1, wherein the amount of solid particles in the mixture is not greater than 40 vol %.

14. The method of claim 1, wherein the inhibition zone has a thickness of at least an average size of the solid particles in the mixture.

15. The method of claim 1, wherein an average particle size of the solid particles is not greater than 25% of a thickness of the inhibition zone.

16. A method of forming a body comprising:
providing an assembly including a chamber containing a mixture, the mixture comprising a radiation-curable material, and a construction;
forming a three-dimensional body by continuously creating and attaching a radiation cured translating portion to a carrier plate of the construction and increasing a distance between the carrier plate and the mixture in a continuous manner to create a three-dimensional body within the mixture, wherein during forming the three-dimensional body is adjacent to an interface of an inhibition zone of the mixture, and the carrier plate is moving away from the inhibition zone during forming of the three-dimensional body,
wherein the mixture comprises
a content of solid particles of at least 15 vol % for a total volume of the mixture; and a viscosity of at least 50 cP at a shear rate of less than about 5 Hz, and a viscosity of less than 1000 cP at a shear rate greater than about 25 Hz;
and
wherein forming comprises selecting a power range of an applied electromagnetic radiation used for curing the radiation-curable material, wherein the power range of the electromagnetic radiation is based at least in part upon a material of the solid particles, an amount of the solid particles in the mixture, and an average particle size of the solid particles in the mixture, and the applied electromagnetic radiation has a power of at least 0.1 mW/cm$^2$ and not greater than 250 mW/cm$^2$.

17. The method of claim 16, further comprising sintering of the three-dimensional body to remove the radiation curable material after curing.

18. The method of claim 17, wherein sintering is conducted at a temperature of at least 900° C. and not greater than 1600° C.

19. The method of claim 16, wherein the radiation-curable material comprises a photoinitiator and a polymerizable monomer.

20. The method of claim 16, wherein the electromagnetic radiation has a wavelength from at least 370 nm to not greater than 450 nm.

21. The method of claim 16, wherein the solid particles include ceramic particles, metallic particles, polymeric particles, or any combination thereof.

22. The method of claim 21, wherein the solid particles include ceramic particles and polymeric particles, and the solid polymeric particles do not dissolve in the mixture.

23. The method of claim 21, wherein the solid particles include polymeric particles, and the solid polymeric particles do not dissolve in the mixture.

24. The method of claim 16, wherein the mixture is a shear thinning slurry.

25. The method of claim 16, wherein forming of the three-dimensional body is conducted at a speed of at least 25 mm/hr.

26. A method of forming a body comprising:
forming a three-dimensional body using an additive manufacturing process, the three-dimensional body having a content of ceramic solid particles of at least 15 vol % for a total volume of the three-dimensional body, wherein the three-dimensional body has a total volume of at least 0.1 mm$^3$, and wherein forming of the three-dimensional body is conducted in a vertical direction from an interface of a mixture at a speed of at least 25 mm/hr, the mixture comprising a radiation-curable material, wherein forming comprises selecting a power range of an applied electromagnetic radiation used for curing the radiation-curable material, wherein the power range of the electromagnetic radiation is based at least in part upon a material of the solid particles, an amount of the solid particles in the mixture, and an average particle size of the solid particles in the mixture, and wherein the applied electromagnetic radiation has a power of at least 0.1 mW/cm$^2$ and not greater than 250 mW/cm$^2$.

27. The method of claim 26, wherein the speed is at least 60 mm/hr.

28. A method of forming a body comprising:

forming a three-dimensional body from a mixture, the mixture comprising at least 15 vol % of solid polymeric particles for a total volume of the mixture and a radiation-curable material, wherein forming includes continuous translation and growth of the body from an interface of the mixture, wherein the interface of the mixture is adjacent to an inhibition zone of the mixture, and the solid polymeric particles do not dissolve in the mixture, wherein forming comprises selecting a power range of an applied electromagnetic radiation used for curing the radiation-curable material, wherein the power range of the electromagnetic radiation is based at least in part upon a material of the solid particles, an amount of the solid particles in the mixture, and an average particle size of the solid particles in the mixture, and the applied electromagnetic radiation has a power of at least 0.1 mW/cm$^2$ and not greater than 250 mW/cm$^2$.

* * * * *